United States Patent
Brink et al.

(10) Patent No.: US 9,407,870 B2
(45) Date of Patent: *Aug. 2, 2016

(54) SYSTEM AND METHOD FOR GROUP VIDEO MESSAGING SERVICE

(71) Applicant: LiveQoS Inc., Ottawa (CA)

(72) Inventors: Ryan Brink, Long Sault (CA); Pranay Kumar, Kanata (CA); Gregory Flatt, Stittsville (CA); Desmond McNamee, Ottawa (CA)

(73) Assignee: LiveQoS Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/592,975

(22) Filed: Jan. 9, 2015

(65) Prior Publication Data

US 2015/0181162 A1    Jun. 25, 2015

Related U.S. Application Data

(63) Continuation of application No. 13/804,651, filed on Mar. 14, 2013, now Pat. No. 8,966,598.

(60) Provisional application No. 61/651,977, filed on May 25, 2012.

(51) Int. Cl.
*H04L 29/06* (2006.01)
*H04N 7/15* (2006.01)

(52) U.S. Cl.
CPC ............... *H04N 7/15* (2013.01); *H04L 63/065* (2013.01); *H04L 63/10* (2013.01); *H04L 63/101* (2013.01); *H04L 63/104* (2013.01)

(58) Field of Classification Search
None
See application file for complete search history.

(56) References Cited

U.S. PATENT DOCUMENTS

| | | | | |
|---|---|---|---|---|
| 2003/0208543 | A1* | 11/2003 | Enete | H04L 12/1822 709/206 |
| 2004/0218609 | A1* | 11/2004 | Foster | H04L 12/5692 370/401 |
| 2005/0015443 | A1* | 1/2005 | Levine | H04L 12/5835 709/204 |
| 2005/0015543 | A1 | 1/2005 | Krantz | |
| 2007/0094374 | A1* | 4/2007 | Karia | H04L 29/06027 709/223 |
| 2007/0281689 | A1* | 12/2007 | Altman | G06Q 30/0207 455/435.1 |

(Continued)

OTHER PUBLICATIONS

Viddy, http:l/web.archive.org/web/20120524052055/http:l/lfWVIN.viddy.com/, May 24, 2012 (2 pages).

(Continued)

*Primary Examiner* — Hadi Armouche
*Assistant Examiner* — Andrew Steinle
(74) *Attorney, Agent, or Firm* — Nixon Peabody LLP

(57) ABSTRACT

A group video messaging method stores user information identifying authorized users of a video messaging system, and provides a user interface to the video messaging system. The user interface permits authorized users to transfer video files to the video messaging system for storage and retrieval, and to identify criteria for other authorized users to access each transferred video file. The method also stores in the video messaging system the video files transferred to the system by the authorized users; stores information identifying the user that transferred each stored video file to the video messaging system, and the criteria for authorized users to access the stored video files; and stores information identifying different groups of the authorized users and which of the stored video files are to be accessible to each of the authorized users or authorized user groups.

15 Claims, 51 Drawing Sheets

(56) References Cited

U.S. PATENT DOCUMENTS

2010/0250691 A1* 9/2010 Tomkow ............ H04L 12/5875
709/206
2012/0203893 A1* 8/2012 Williams ............ H04L 69/163
709/224

OTHER PUBLICATIONS

Socialcam, http:l/web.archive.orglvveb/20120511055259/http://lfWVIN.socialcam.com/, May 11, 2012, (5 pages).
Twitvid, http:l/web.archive.org/web/20120523080819/http:l/lfWVIN.twitvid.com/, May 23, 2012, (1 page).
Chris Burns, "Hands on with Viddy: Instagram for Videos," SlashGear, URL: http://lfWVIN.slashgear.com/hands-on-with-viddy-instagram-for-videos-13222863/, Apr. 13, 2012 (8 pages).
Debra Black "Instagram next? Viddy lets anyone be a filmmaker," Toronto Star, URL: http:lllfWVIN.thestar.com/business/2012/04/13/instagram_next_viddy_lets_anyone_be_a_filmmaker.print.html, Apr. 13, 2012 (2 pages).
Tom Cheredar "Twitvid relaunches as a social video network, adds support for channels," VentureBeat, URL: http:l/venturebeat.com/2011/12/13/twitvid-update/, Dec. 13, 2011 (3 pages).
Jason Kincaid "After a Hot Start, Justin.tv Spins Off Socialcam, Its Instagram for Video", Aug 29, 2011, TechCrunch, URL: http:l/techcrunch.com/2011/08/29/after-a-hot-start-justin-tv-spins-off-socialcam-its-instagram-for-video/, Aug. 29, 2011 (2 pages).

* cited by examiner

Select some friends to invite:
Ryan Brink — 3701
Kat Nguyen — 3702
Desmond McNamee — 3703
Jean-Elie J. — 3704
Gregory Flatt — 3705
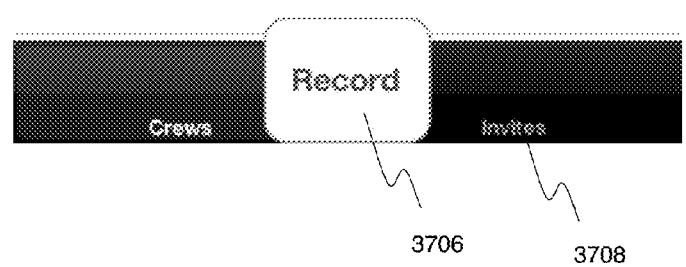
FIG 37

SYSTEM ARCHITECTURE 4600

SYSTEM AND METHOD FOR GROUP VIDEO MESSAGING SERVICE

CROSS-REFERENCE TO RELATED APPLICATION(S)

This application is a continuation of and claims priority to U.S. application Ser. No. 13/804,651, filed Mar. 14, 2013, now allowed, which claims priority to U.S. Provisional Application No. 61/651,977, filed May 25, 2012, each of which is hereby incorporated by reference herein in its entirety.

FIELD OF THE INVENTION

The present invention relates to communication data networks. More specifically, the present invention relates to systems and methods for increasing the throughput of data transmissions through a network as seen from the edge of the network.

BACKGROUND OF THE INVENTION

To enable data communication from a source end-station or network to a destination end-station or network, packet-based networks break-up data streams into smaller packets of data. As these packets traverse a network, some of these packets can be lost due to congestion or other network limitations. This loss can have a tremendous impact on the applications leveraging the communication channel between the source and destination end-stations. Ideally, a network, from the point of view of many applications, must provide perfect performance with deterministic packet latency and no packet loss. However, the capital and operational cost to achieve perfect network performance is not practical for most service and enterprise network providers.

Accordingly, systems and methods are required which can be used with low cost networks to provide applications with a high network performance. One approach is to create new encoding protocol stacks which are installed at the end-stations to improve the response to loss and latency. However, this approach is non-trivial since all end-stations in the source and destination networks must be upgraded to use the new encoding protocol stacks.

Another approach uses network devices that intercept standard protocols, and an encoding protocol between the intercepting network devices, to recover from network loss. These devices are deployed in areas of the network where resident applications require better network performance than what is generally available in the network itself. Such devices are described in pending U.S. patent application Ser. No. 12/718,650, filed Mar. 5, 2010, which is a continuation-in-part of U.S. patent application Ser. No. 12/193,345, filed Aug. 18, 2008, now U.S. Pat. No. 8,009,696, which is a continuation-in-part of U.S. patent application Ser. No. 10/912,200, filed Aug. 6, 2004, now U.S. Pat. No. 7,742,501.

Existing access networks generally provide poor and unreliable quality. In general, the resulting performance is unreliable and quality is unpredictable. On the other hand, the backbone networks have been upgraded with high speed links and generally have sufficient capacity and the engineering is more reliable.

To avoid having to stay on the poor quality network to reach content, caching has been implemented pervasively. Caching is a solution to improve the performance by duplicating data at multiple locations such that the data is closer to the application, alleviating some of the network quality issues due to long hops.

However, not all content can be cached (e.g., real-time applications, user-generated content) and cost of caching may be prohibitive. Lastly the location of cache might still be too far away from the source, therefore still resulting in poor performance.

There is a need to improve the performance of applications that cannot be cached or where caching is unaffordable or proximity is not achievable.

SUMMARY OF THE INVENTION

In one embodiment, a group video messaging method comprises storing user information identifying authorized users of a video messaging system, and providing a user interface to the video messaging system. The user interface permits the authorized users to transfer video files to the video messaging system for storage and retrieval, and to identify criteria for other authorized users to access each transferred video file. The method also stores in the video messaging system the video files transferred to the system by the authorized users; stores information identifying the user that transferred each stored video file to the video messaging system, and the criteria for authorized users to access the stored video files; and stores information identifying different groups of the authorized users and which of the stored video files are to be accessible to each of the authorized users or authorized user groups.

In one embodiment, a group video messaging system comprises a storage device containing video files, user information identifying authorized users of the video messaging system, and information identifying different groups of the authorized users and which of the video files are to be accessible to each of the authorized users or authorized user groups; a processor coupled to the storage device for controlling the storage and retrieval of the user information; and a user interface coupled to the processor to permit the authorized users to transfer to the processor (1) video files for storage in the storage device, (2) criteria for other authorized users to access each transferred video file, and (3) information identifying the transferring user.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

Embodiments of the present invention will now be described, by way of example only, with reference to the attached Figures, wherein:

FIG. 37 shows an example of a friend invite screen.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
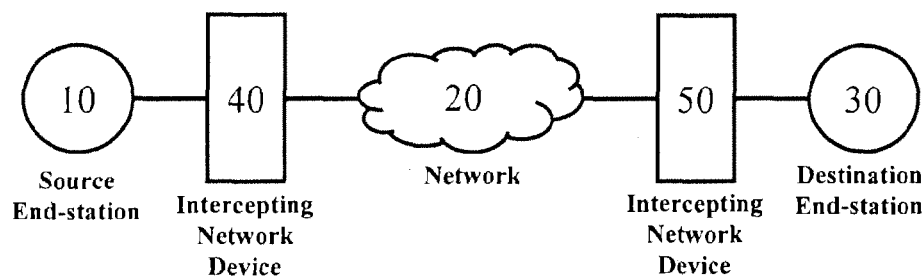
FIG. 1 is a block diagram of an environment in which the invention may be practiced.

FIG. 1 illustrates a network environment in which a source end-station 10 and a destination end-station 30 have applications which communicate using a standard protocol (generally, packet-based). This protocol is carried through a network 20 which can be, for example, the Internet or some other communications network. The end-stations 10 and 30 can be terminals, such as personal computers connected through a modem, local or wide-area networks, or other devices or systems having access to the network 20. For certain applications resident on the end stations 10 and 30, better network performance is required, and packets related to these applications are intercepted by network devices 40 and 50. Referred to as "intercepting" network device, the network devices 40 and 50 encode the standard packets using an encoding protocol to increase network performance. To illustrate how this network operates, standard packet flow is assumed from the source end-station 10 to the destination end-station 30 (i.e., left to right in FIG. 1). The intercepting network device 40 encodes the standard packets from the source end-station 10 and forwards the encoded packets to the intercepting network device 50 through the network 20. The intercepting network device 50 decodes the packets and forwards the reconstituted standard packet to the destination end-station 30. In the reverse direction, packets flowing from the destination end-station 30 to the source end-station 10 are encoded by the intercepting network device 50 and forwarded to the intercepting network device 40 over the network 20. The intercepting network device 40 decodes these packets, and the reconstituted standard packets are forwarded to the source end-station 10.

Figure 2:
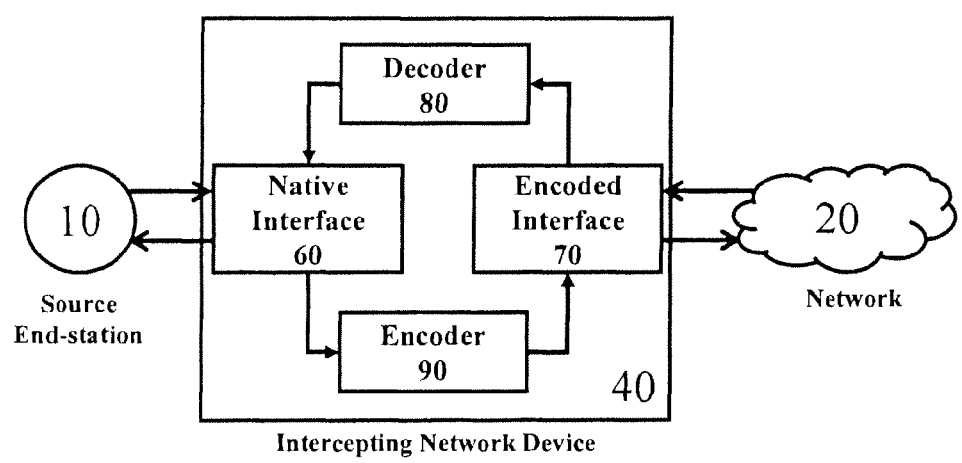
FIG. 2 is a block diagram illustrating the components in an intercepting network device used in FIG. 1.

FIG. 2 depicts an exemplary embodiment of the intercepting network device 40 that includes modules necessary to implement the encoding protocol to improve network performance. The modules can be resident in a single device, or can be distributed amongst several devices. In the illustrative embodiment of FIG. 2, the intercepting network device 40 includes a native interface 60, an encoded interface 70, a decoder 80, and an encoder 90. The native interface 60 sends and receives standard packets to and from the source end-station 10, and the encoded interface 70 sends and receives encoded packets to and from the network 20.

The encoder 80 receives standard packets from the native interface 60 and produces encoded packets by dividing the packet into one or more segments which then are ready for transmission to the network 20 by way of the encoded interface 70. The decoder 90 receives encoded packets from the encoded interface 70 and produces standard packets for transmission to the source end-station 10 by way of the native interface 60.

To assist in recreating the standard packets from the encoded packets, the encoder 90 may also create extra encoded packets. These extra encoded packets are derived from the standard packets and encoded packets. The extra encoded packets assist the decoder in the destination intercepting network device 50 to recreate or reassemble the original standard packets in the event one or more encoded packets are lost during their transmission through the network 20.

Figure 3:
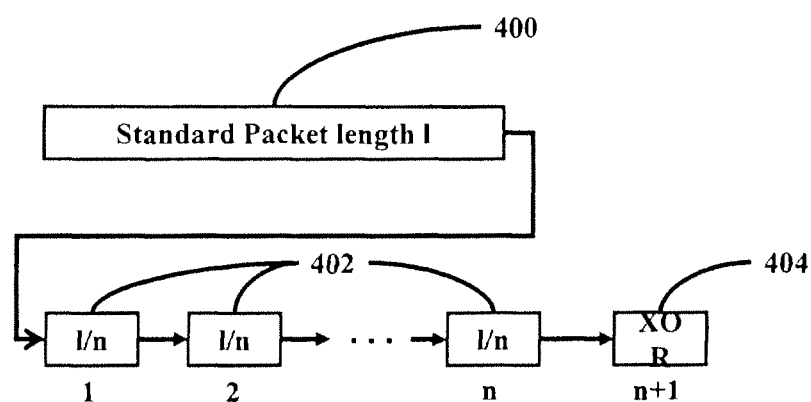
FIG. 3 illustrates an exemplary segmentation and encoding of a standard packet.

The encoding of a standard packet according to one embodiment is illustrated in FIG. 3. To simplify the description, headers have been omitted from the original standard packet and the encoded packets. A standard packet 400 received at an encoder has a packet payload of 1 byte, and is segmented into n segments 402. Where n is chosen as an integer factor of 1, each of the n segments will have 1/n bytes, as shown. In addition, m extra encoded packets are created. In the example shown in FIG. 3, m=1 and the additional or extra segment 404 is a parity segment created by applying a logical function (e.g., XOR function) to all of the n segments.

Once the encoder has completed the process of creating the segments and the extra encoded segment, headers are added to the packets to create encoded packets and extra encoded packets. The headers use a standard protocol such that no proprietary operational functions are expected in the network. Therefore, the encoded and extra encoded packets are carried through the network to the decoding intercepting network element. The encoder can take into account the size of the packet and can increase n automatically to avoid transmitting an encoded packet of a size that would exceed the Maximum Transfer Unit (MTU) of the network when the standard protocol header is added to the encoded packet. This capability can also be useful for splitting jumbo frames prior to entering a network that cannot handle them.

As a decoder reassembles standard packets from the encoded and extra encoded packets, it can deal with loss of encoded packets. If enough information is contained in the extra encoded packets, missing segments caused by lost encoded packets can be recreated. If the loss is too great, the encoder has options. If the standard packet has a limited lifespan (such as a video packet), then the affected standard packet is discarded. If the application natively provides resiliency to packet loss, then again, the standard packet may be discarded. If the standard packet has a reasonable lifespan and the application does not provide resiliency natively, the decoder can request a retransmission of the missing segment from the encoder. This assumes that the encoder buffers the standard packet until it has been successfully decoded on the other end of the network.

To enable higher network performance for communicating applications, an encoding channel is established between intercepting network devices. Examples of how these channels are created are described in U.S. patent application Ser. No. 12/193,345. For the purpose of this application, an encoded channel between the intercepting network devices 40 and 50 is assumed to be successfully negotiated. The encoded channel is used to carry both data and control information, and encoded packets and extra encoded packets can now be sent and received between the intercepting network devices.

Applications residing on end-stations in the network above can tolerate different levels of lost packets within the communication network. The intercepting network devices can differentiate these applications based upon standard protocol signaling elements. File transfers using FTP are signaled using a TCP port. This will open TCP ports in the 64000 range to transport the files between the end-stations. TCP is resilient to loss and variation of latency within the network. The key goal of the transfer is to ensure that the file arrives intact and in as timely a manner as the network will allow. This application is in contrast to a video conference application. These can be signaled using the Session Initiation Protocol on UDP port 5060 and contains the information for the video, voice and data sessions associated with the conference. Video sessions have a low tolerance to loss; the loss of an eye frame (a complete picture of the screen) can greatly disrupt video compression algorithms. The greater the bandwidth required for a video stream, the lower the tolerance for loss since each standard packet is carrying more information related to the video stream. Voice sessions are relatively more tolerant to loss due to the predictive nature of human speech. Voice codecs are able to fill in gaps to ensure a continuous voice stream. In either case, video and voice sessions need to have less than 1% standard packet loss to avoid video blocking or voice clipping, and most providers attempt to keep standard packet loss at less than 0.5%.

Within the context on a given session, the different streams can be treated with different loss objectives. Deep Packet Inspection (DPI) can be used in the intercepting network devices to detect the type of application (video/voice/data) and set the loss objectives according to a configured network policy for that type of application. Ultimately each standard packet can have its own loss objective based on information provided in the header that identifies the level of protection required (e.g., SVC—scalable video codec). This loss objective is defined as the Target Loss Ratio (TLR).

The TLR can be used to determine the encoding rate which is determined by both n and m. The encoding rate can be adjusted based on observed and/or reported network performance for one or all encoded channels terminating at an encoding component associated with a given intercepting network device. The goal is to set the encoding level such that the encoded channel achieves the TLR for the session or better.

Figure 4:
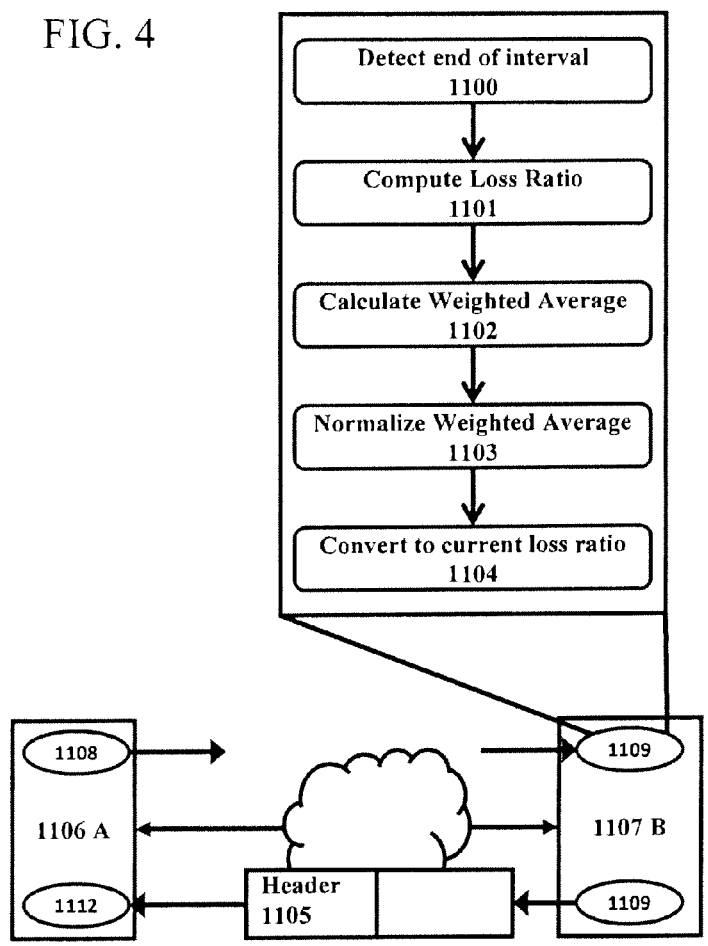
FIG. 4 illustrates a first example algorithm to evaluate loss.

Referring to FIG. 4, the determination of the loss ratio observed is described in relation to the encoded channel between intercepting network device A 1106 and intercepting network device B 1107, more specifically looking at the channel in the direction from intercepting network device A to intercepting network device B. Under a "no loss", or acceptable loss, condition, the encoding can be set to n=1 and m=0 to avoid using extra bandwidth in the network when it is not necessary. The decoder 1109 of the intercepting network device B 1107 counts the number of packets received $P_x$ and the number of packets lost $LP_x$ over an interval of W units of time (for example W=8 seconds) using the subroutine illustrated in FIG. 4. The interval period can also be defined as the reception of a particular number of packets. Alternatively, $LP_x$ can represent the number of retransmission requests, such that the successfully recovered loss is not counted as part of the loss ratio. The end of each interval is detected at step 1100, and the loss ratio $L_x$ is calculated at step 1101 using, for example, the following ratio:

$$L_x = \frac{LP_x}{(LP_x + P_x)} \quad (1)$$

$P_x$ in equation 1 can be the number of standard packets transmitted over the time period W. In this case, $LP_x$ is the number of lost standard packets. This is referred to the $SPL_x$. Another option for $P_x$ is to count the number of encoded segments and extra encoded segments which should have arrived at the decoder to re-assemble the standard packets over the time period W. $LP_x$ then is the number of segments and extra segments which were lost in the network over the time period W. This is referred to the $EPL_x$. In general, $SPL_x$ is lower than $EPL_x$ due to the fact that the encoding scheme helps the decoder recover from loss, allowing standard packets to be reproduced even though encoded packets related to the standard packet were lost. From that perspective, $EPL_x$ is a truer indication of the performance of the network.

The current loss ratio ($L_x$) can refer to loss calculated from measurement of standard packets ($SPL_x$). It can refer to current loss calculated from encoded and extra encoded segments ($EPL_x$). It can also refer to a current loss ratio calculated from the combination of SPLx and EPLx. One example of this combination is:

$$CLR_x = \frac{\omega_S SPL_x + \omega_E EPL_x}{\omega_s + \omega_E} \quad (2)$$

where $\omega_S$ is the weight given to the loss of standard packets and $\omega_E$ is the weight given to the loss of encoded segments.

To avoid reacting to random events, step 1102 computes an average loss over the last z loss measurements. In order to take into account the most recent network status, a weighted average can be performed to weight the most recent current loss ratio measurements, e.g., using the equation:

$$WL_x = \frac{\sum_{i=(z-x)\cdot z} \langle CLR_i \times \omega_i \rangle}{\sum_{i=1\cdot z} \omega_i} \quad (3)$$

where $WL_x$ represents the weighted average of the most recent loss measurements for interval x. The weights are such that $\omega_i < \omega_j$ for $i < j <= x$.

To avoid keeping track of many loss measurements, the previous weighted loss can also be used to evaluate the new weighted loss, e.g., using the equation:

$$WL_x = \frac{\langle WL_{x-1} \times \omega_{old} \rangle + \langle CLR_x \times \omega_{new} \rangle}{\omega_{old} + \omega_{new}} \quad (4)$$

where $\omega_{old}$ and $\omega_{new}$ are weights that are set in general such that $\omega_{old} < \omega_{new}$.

Optionally the weighted loss ratio can be normalized at step 1103 to simplify the lookup using integers only. The normalized loss $NL_x$ can be computed using the following equation:

$$NL_x = \frac{N \times WL_x}{P_x} \quad (5)$$

where N is the normalization factor (e.g., N=10000).

$NL_x$ is then used to index an encoding level table at step 1104 to extract the current encoding level. An example of an encoding level table is shown below, providing 8 levels, where INT_max represents the largest integer or a large value (e.g., 10000).

| $NL_x$min | $NL_x$max | Encoding Level |
|---|---|---|
| 0 | 0 | 0 |
| 1 | 75 | 1 |
| 75 | 145 | 2 |
| 146 | 185 | 3 |
| 186 | 210 | 4 |
| 211 | 260 | 5 |
| 261 | 370 | 6 |
| 371 | INT_max | 7 |

The encoder 1111 of the intercepting network device B 1107 then inserts the extracted encoding level 1105 in the header of each encoded packet sent for that session to the intercepting network device A 1106. The decoder 1112 in the intercepting network device A 1106 reads the encoding level from the received packets. It then indexes a new parameter table with the encoding level to obtain the value of I and Max_n, which represents the largest value to which n should be set given the current encoding level. Multiple new parameter tables can be used to achieve different TLRs based on the application requirements and acceptable overhead. An example of such a new parameter table using 8 loss ratios is shown below:

| Encoding Level | Max_n | m |
|---|---|---|
| 0 | INT_max | 0 |
| 1 | INT_max | 1 |
| 2 | INT_max | 1 |
| 3 | 3 | 1 |
| 4 | 2 | 1 |
| 5 | 2 | 1 |
| 6 | 1 | 1 |
| 7 | 1 | 1 | where INT_max represents the largest integer (infinity).

Before the encoder 1108 of the intercepting network device A 1106 encodes a packet of size s, it indexes a preconfigured packet size table with s, to obtain Rec_n, which represents the recommended value of n given the packet size. An example packet size table is show below:

| Packet Size (bytes) | Rec_n |
|---|---|
| <88 | 1 |
| 89 to 264 | 2 |
| 265 to 528 | 3 |
| >528 | 4 |

Using this table, a packet of size s<88 bytes returns Rec_n=1. If s>528 bytes, then Rec_n=4. The value of n used to encode the packet is then determined as n=min(Rec_n, Max_n).

In another embodiment, the decoder 1109 calculates the weighted loss ratio $WL_x$ using equation (3) or (4) above. It can optionally normalize to compute $NL_x$ using equation (5). The exact loss value ($WL_x$ or $NL_x$) is sent at regular intervals (e.g., every second) to the decoder 1112 in a control message that is inserted in the encoded channel for the session. The decoder 1112 extracts the exact loss values from the control messages. The encoder 1108 uses the exact loss value to index a new parameter table to obtain Max_n and m.

| $NL_x$ min | $NL_x$ max | Max_n | m |
|---|---|---|---|
| 0 | 0 | INT_max | 0 |
| 1 | 75 | INT_max | 1 |
| 76 | 145 | INT_max | 1 |
| 146 | 185 | 3 | 1 |
| 186 | 210 | 2 | 1 |
| 211 | 260 | 2 | 1 |
| 261 | 370 | 1 | 1 |
| 371 | 10000 | 1 | 1 |

The value of n is derived as n=min(Rec_n, Max_n). Multiple new parameter tables can be configured to reflect different Target Loss Ratios, and the encoder 1108 uses the appropriate table based on the Target Loss Ratios of the application. Sending the actual loss ratio, instead of the current loss ratio, allows configuration the parameter tables at the encoding side, thus simplifying the configurations.

The previous equations demonstrate how the loss ratio is calculated for individual streams. Using FIG. 5 as an example, an intercepting network device D 1203 calculates the loss ratios of three flows 1204, 1205 and 1206 originating from intercepting network devices A 1202, B 1207 and C 1208, respectively. In addition to returning the loss ratio measured for the flow, the receiving intercepting network device can compute the average of the weighted loss ratio $AL_x$ from the three flows that are sent to it over an interval period x.

The interval period can be the same as the interval period used for calculating the loss ratio for a single flow. The average loss ratio can be calculated, for example, as:

$$AL_x = \frac{\sum_{i=1 \ldots f} WL_i}{f} \quad (6)$$

where $WL_i$ can be calculated using equation (3) or (4) above. The $AL_x$ can then be normalized using equation (5) above to create a normalized average loss ratio, $NAL_x$. The $NAL_x$ is then indexed in an encoding level table to obtain an average loss ratio at the far end ($ALFE_x$). The encoding level table can be the same as illustrated above or preconfigured with different numbers. The $ALFN_x$ is added to the packet header of the encoded packets transmitted by the decoder of the intercepting network device D 1203 to the respective intercepting network devices 1202, 1207 and 1208 along with the per flow current loss ratio computed as described above.

If the aggregate information is included in the packet header, the intercepting network device 1202, 1207 or 1208 can use the information to decide whether to change its encoding level. The decoder of the intercepting network device A 1202 also calculates the average loss at the near end ($ALNE_x$) which is the average of the current loss ratio received in the encoding channel from the g encoded sessions 1211, 1212 and 1204 active during a measurement period x, $$ALNE_x = \frac{\sum_{i=1 \cdot g} \text{Current Loss Ratio}}{g} \quad (7)$$

Figure 5:
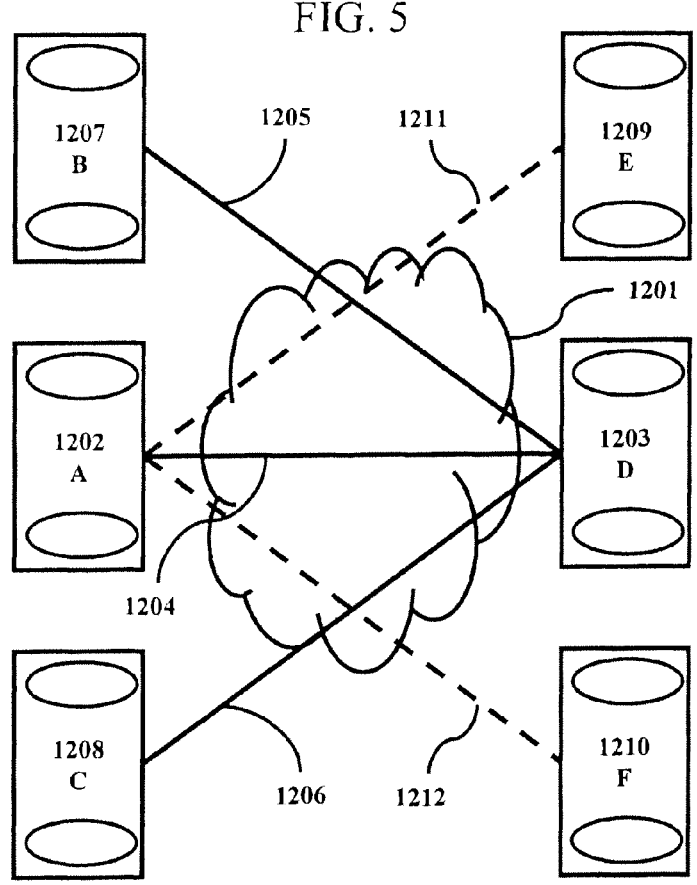
FIG. 5 illustrates an example embodiment considering average loss.

In the example of FIG. 5, the $ALNE_x$ calculated at the intercepting network device A 1202 represents the average of the current loss ratio received from intercepting network devices D 1203, E 1209 and F 1210.

If the difference between the current loss ratio for the session and the $ALFE_x$ is below a predetermined threshold, the current loss ratio is used to set the encoding level, as described above. In this case, it is assumed that it is unlikely that the sessions are congesting the upstream network since the current loss ratio is better, or slightly worse than, the computed $ALFE_x$.

If the difference between the current loss ratio and the $ALFE_x$ is greater or equal to a predetermined threshold AND the current loss ratio minus the $ALNE_x$ is greater than or equal to a predetermined threshold, then the current loss ratio is ignored, and the encoding levels are set according to the packet size table only to minimize bandwidth usage by choosing the most bandwidth-efficient encoding method for the given packet. The predetermined thresholds could be different and set according to network policies and topology.

Irrespective of how n is determined (current loss or average loss), the increase in the value of n can be performed gradually to avoid a big step in the increase of overhead. When a higher value of n is recommended by the table, it can be applied to only a subset of the subsequent standard packets: only v standard packets out of the next incoming w standard packets use the increased value of n, while the other w-v packets use the previous lower value for n. The values of v and w can also change if the measured loss ratio continues to increase or as the measured loss ratio approaches the next level.

For example, if the measured loss (weighted or normalized) is 0%, then n=1, m=0 and v=w=1. Therefore all packets are encoded with n=1, m=0. If the measured loss increase to greater than 0% but lower than 0.05%, then n=4, m=1, but v=1 and w=3, such that only one out of three packets is encoded with n=4, while the others use the previous encoding level n=1, m=0. When the measured loss exceeds 0.05% but is below 0.1%, then change to v=1 and w=2, such that every second packet is encoded with n=4, while the others use the previous encoding level n=1, m=0. When the measured loss exceeds 0.1% but is below or equal to 0.2%, then use v=1 and w=1, such that every packet is encoded with n=4. Different values of v and w can be configured to smooth out the overhead increase at different predetermined loss ratios. This capability can significantly smooth out the transfer function between different loss ratios.

Intercepting network devices operate on the theory that network loss will decrease as the encoding level is increased. However, as n and/or m are increased, the number of packets generated by the intercepting network devices and, traversing the network, is increased. This results in an increase in the bandwidth required to achieve application communication.

The additional bandwidth may in some circumstances lead to an increase in loss. If one or more links in the path are bandwidth constrained, the additional packets actually increase congestion at this point. When a packet arrives at a link for transmission, it may or may not be able to be transmitted immediately. If the packet cannot be sent, most devices implement a queue to buffer the packet so that it can be transmitted later. In some devices, as the queues associated with this link grow to a particular level, a network congestion control mechanism (e.g., RED, WRED, etc.) may be invoked to handle the congestion on this link. As the number of packets arriving at this link is increased, the likelihood of one of the encoded packets being discarded is increased. The probability is also increased due to the additional overhead added by the encoding channel. The additional overhead increases the depth of the queue more quickly thus increasing the likelihood that a packet will be discarded.

Another cause of congestion can be switching context. A network device in the path between the source end-station and the destination end-station may only be able to forward a limited number of packets per period of time. Therefore, even though enough link bandwidth is available to transport the encoded packets, the network device cannot forward all the frames, leading to loss.

Therefore, by increasing the encoding level which increases the number of packets in the path and the amount of overhead, the loss ratio may increase. The intercepting network device requires an algorithm to react to this situation. First, the intercepting device needs to detect a significant increase in loss ratio on an encoding channel. This can be done, for example, by tracking the results of the loss ratio over a period of time. This can be the current loss ratio as calculated by equation (1) or (2), the weighted loss ratio calculated by equation (3) or (4), the normalized loss ratio calculated by equation (5), or any other method to obtain loss.

One method of detecting a significant increase is to use the instantaneous change in the loss ratio. This looks at the difference between the current loss ratio and the previous loss ratio'.

$$\Delta CLR_x = CLR_x - CLR_{x-1} \quad (8)$$

If this difference exceeds a significant increase threshold, defined as SIT, then a significant increase in loss ratio is detected. To avoid spuriously declaring that a significant increase has occurred, the number of encoded packets sent between the source intercepting network device and the destination intercepting network device must be statistically relevant. This is captured in the case equation below:

$$\text{significant increase} = \begin{cases} \text{true} & \text{if packets} \geq \text{minimum relevant and } \Delta CLR_x \geq SIT \\ \text{false} & \text{if packets} < \text{minimum relevant} \end{cases} \quad (9)$$

Instead of using an instantaneous ratio, the previous equations can use the average loss ratio (like equations (3) and (4)). The change can be calculated using equation (10):

$$\Delta WL_x = WL_x - WL_{x-1} \quad (10)$$

Then the significant increase can be determined as follows:

$$\text{significant increase} = \begin{cases} \text{true} & \text{if } \Delta WL_x \geq SIT \\ \text{false} & \text{if } \Delta WL_x < SIT \end{cases} \quad (11)$$

Another approach is to record the loss ratio when an increase in the encoding level is enacted. The change in loss ratio ($CLR_{original}$) is recorded and used as the basis of comparison to the current instantaneous loss ratio. If the current loss ratio is, for example, ten times the original loss ratio, a significant increase in loss has been detected:

$$\text{significant increase} = \begin{cases} \text{true} & \text{if } CLR_x \geq 10 \times CLR_{original} \\ \text{false} & \text{if } CLR_x < 10 \times CLR_{original} \end{cases} \quad (12)$$

Figure 6:
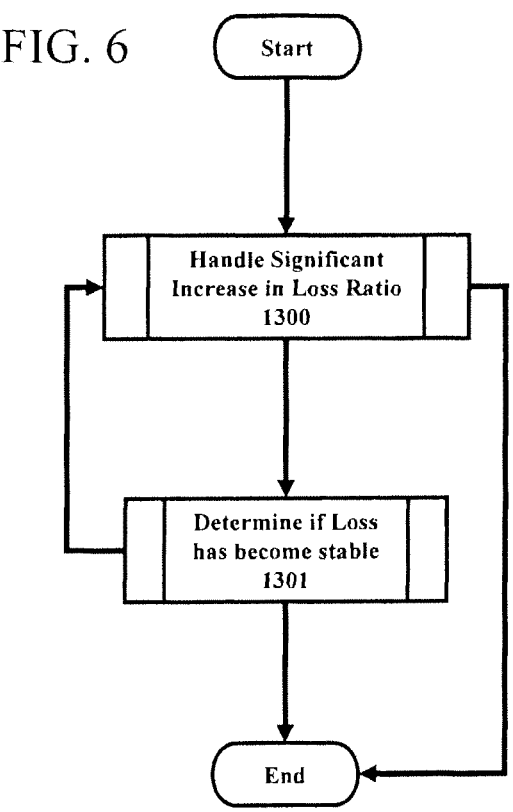
FIG. 6 illustrates an example of encoding level back-off.

Once a significant increase in the loss ratio has been detected, the intercepting network device reacts using an encoding level back-off scheme. In this case, the intercepting network device reacts to loss by decreasing the encoding level instead of increasing it. FIG. 6 is a flow chart of one technique for decreasing the encoding level in response to the detection of a significant increase in the loss ratio. First, step 1300 attempts to find an encoding level that stops the increase in loss ratio. Once this level is achieved, step 1301 ensures that the loss ratio is stable before returning the intercepting network device to normal processing of loss ratio.

Figure 7:
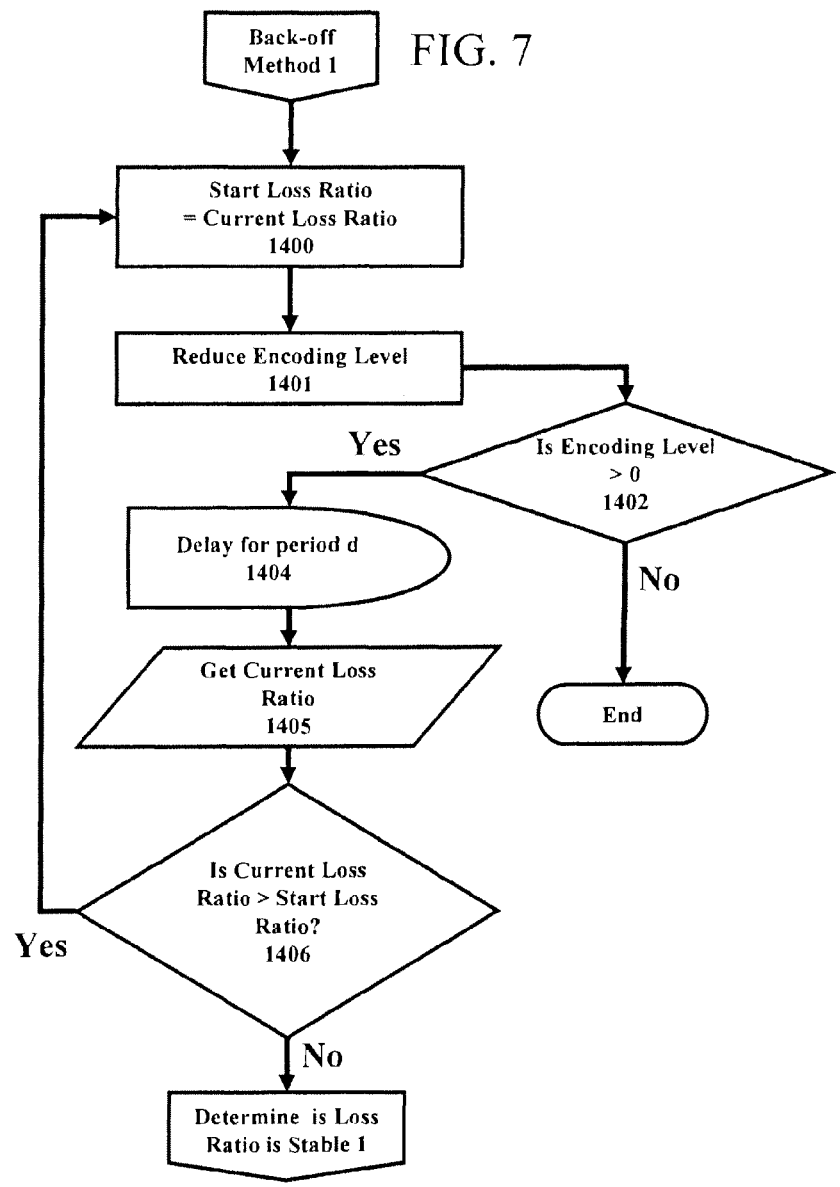
FIG. 7 is a flow chart illustrating the steps executed when a significant increase in loss is detected and encoding level back-off is enabled.

FIG. 7 depicts one implementation of step 1300 in FIG. 6. This algorithm defines the steps to find an encoding level that stops the increase in loss ratio. The algorithm starts by recording the current loss ratio at step 1400, and then the encoding level of the channel is reduced at step 1401. The reduction of the encoding level can be effected in several ways. For example, the encoding level can be reduced linearly for each iteration of the algorithm, or it can be decreased exponentially. One implementation supports both methods and allows one of the methods to be selected when the encoding channel is established. Another example uses a configuration policy that is set before the encoding channel is created.

Once the encoding level has been reduced at step 1401, step 1402 determines whether the encoding level is greater than zero. A negative answer at step 1402 indicates that the current loss ratio is still higher than the starting loss ratio, which indicates that the encoding back-off algorithm is not working, and thus the algorithm is terminated at step 1403. The encoding channel then returns to normal loss ratio processing or reverts to n=1 and m=0 and notifies the user and/or the system.

If the answer at step 1402 is affirmative, the system advances to step 1404 where the intercepting network device waits for a period of time d before sampling the current loss ratio again at step 1405. Step 1406 then determines whether the current loss ratio is greater than the starting loss ratio at step 1406, i.e., the loss ratio is still increasing by some predetermined amount, the algorithm returns from step 1406 to steps 1401 and 1402 to reduce the encoding level for the channel again. If the answer at step 1406 is negative, the system proceeds to step 1407 to determine if the current encoding level results in a stable loss ratio.

Figure 8:
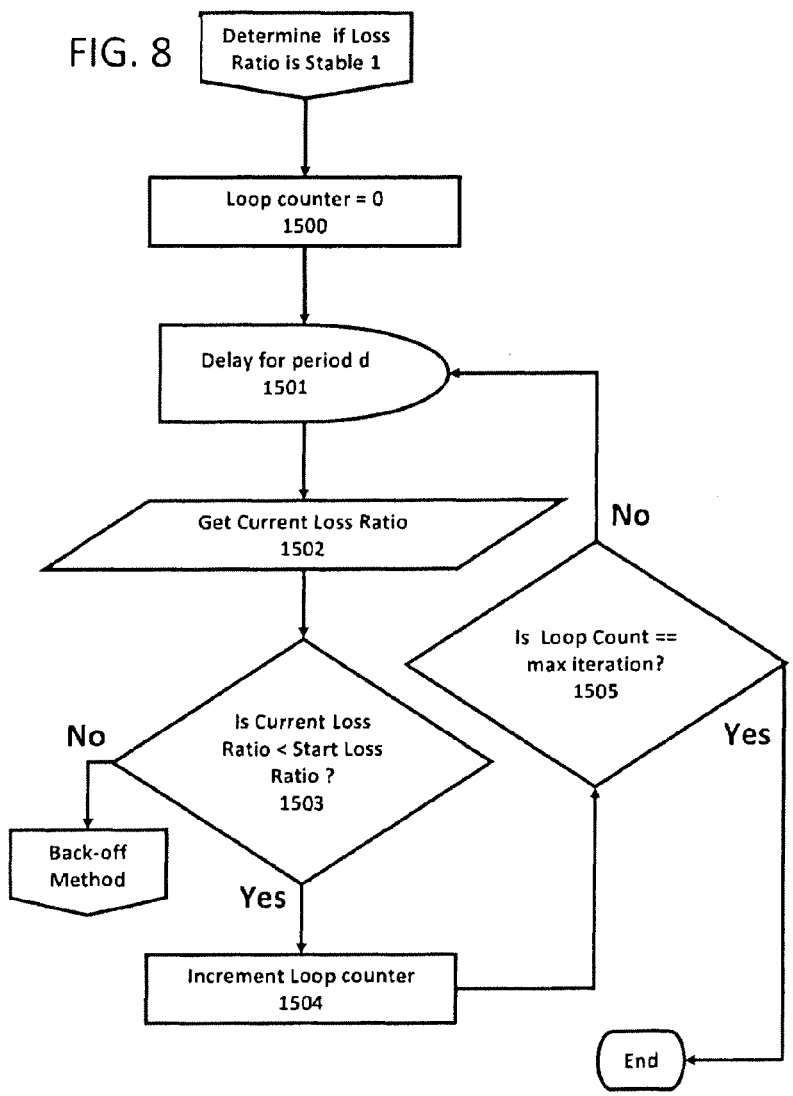
FIG. 8 is a flow chart illustrating the steps executed to detect loss ratio stabilization after encoding level back-off is enabled.

FIG. 8 depicts one implementation of step 1301 in FIG. 6. This algorithm defines the steps to determine if the current encoding level has resulted in a stable loss ratio. The algorithm runs in a loop which is initialized in step 1500. The intercepting network device then waits for a period d at step 1501 before sampling the current loss ratio again at step 1502. If the current loss ratio is significantly greater than the start loss ratio, the algorithm exits and returns to backing off the encoding level at step 1503. Step 1503 determines whether the current loss ratio remains below the starting loss ratio (step 1503), then the algorithm increments the loop counter (step 1504) and continues to sample the current loss ratio until the maximum number of iterations has been reached (step 1505). At this point, the algorithm exits since the significant increase in loss ratio has been handled.

Figure 9:
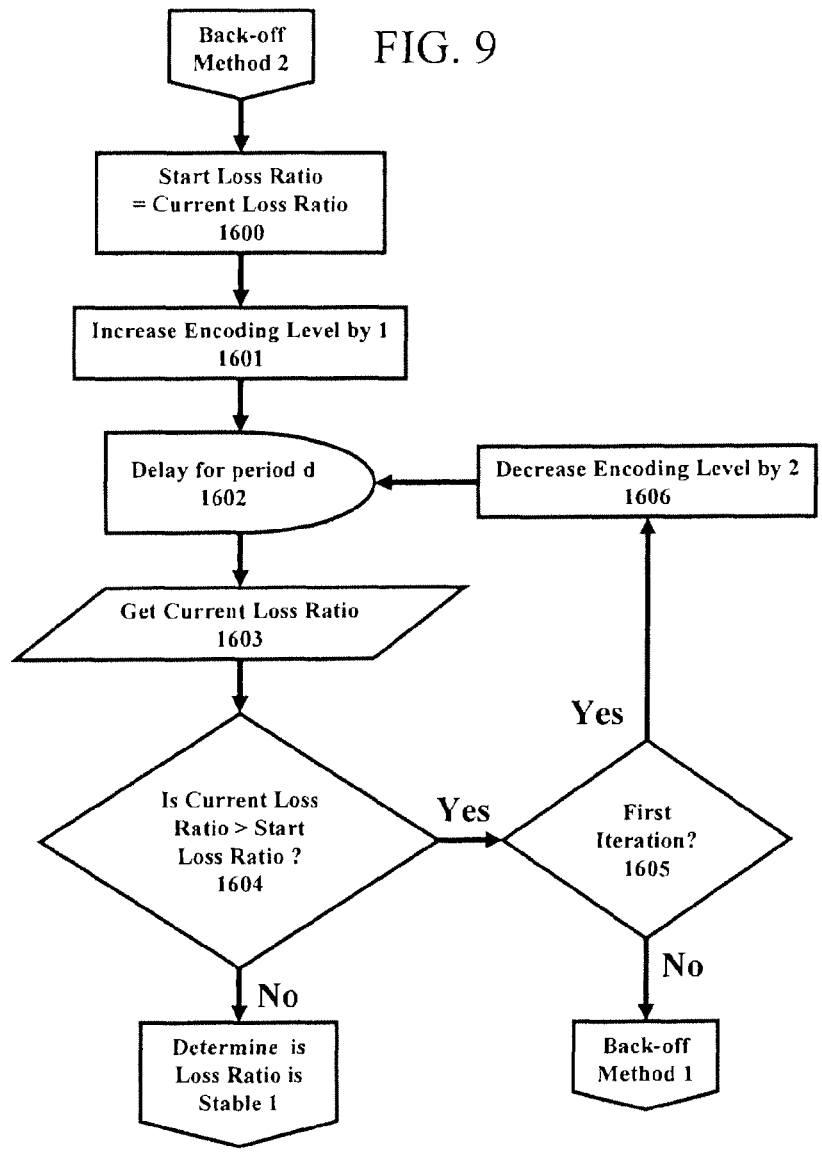
FIG. 9 is a flow chart illustrating an alternate algorithm which is executed when a significant increase in loss is detected and encoding level back-off is enabled.

There are other implementations of the algorithm of FIG. 6. For example, FIG. 9 depicts an alternate implementation of the encoding level back-off scheme. In this case, the algorithm sets the starting loss ratio to the current loss ratio value at step 1600, and then step 1601 initially increases the encoding level to determine whether the loss ratio will be reduced. If step 1604 detects a reduction in the loss ratio, the algorithm exits and proceeds to ensure that the loss ratio is stable before returning to normal loss ratio processing. If step 1604 does not detect a reduction in the loss ratio, the algorithm proceeds to steps 1605 and 1606 to reduce the encoding level by 2 levels, and then to step 1602 to wait for a period before checking the current loss ratio again. If this succeeds (steps 1603 and 1604), again the algorithm ensures that the loss ratio is stable before returning to normal loss ratio processing. If step 1604 determines that the current loss ratio is still greater than the starting loss ratio and step 1605 determines this is not the first iteration, then the algorithm continues backing off the encoding level using the algorithm of FIG. 7.

Figure 10:
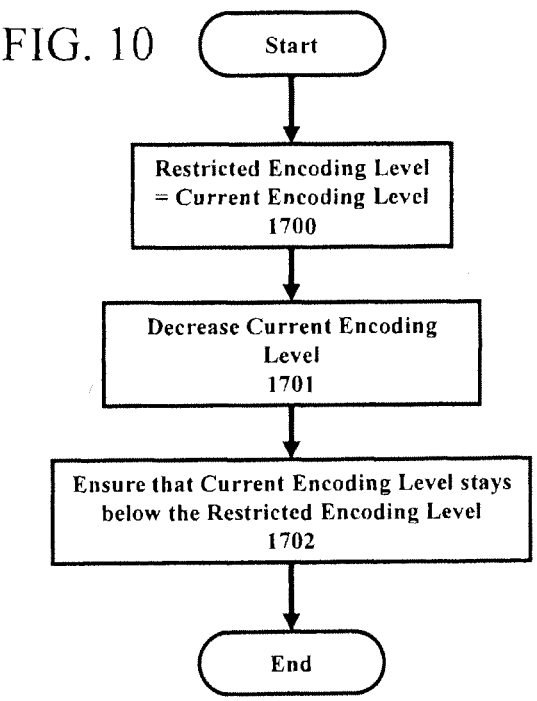
FIG. 10 is a flow chart of an example of restricting an encoding level due to burst loss.

Another approach to handling a significant increase in loss ratio (in step 1300 of FIG. 6) is to restrict the encoding level that is causing the significant increase, using the algorithm of FIG. 10. In step 1700, the current encoding level is recorded as the restricted encoding level, and then the current encoding level is reduced at step 1701. Then step 1702 ensures that the current encoding level remains below the restricted encoding level.

Figure 11:
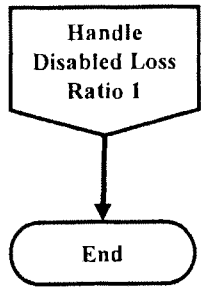
FIG. 11 is a flow chart of an example of handling a restricted encoding level for the remaining time the encoding channel remains open.
Figure 12:
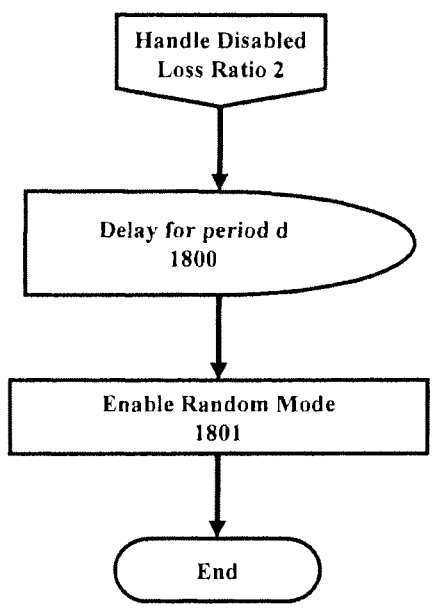
FIG. 12 is a flow chart of an example of handling a restricted encoding level for a period of time d.
Figure 13:
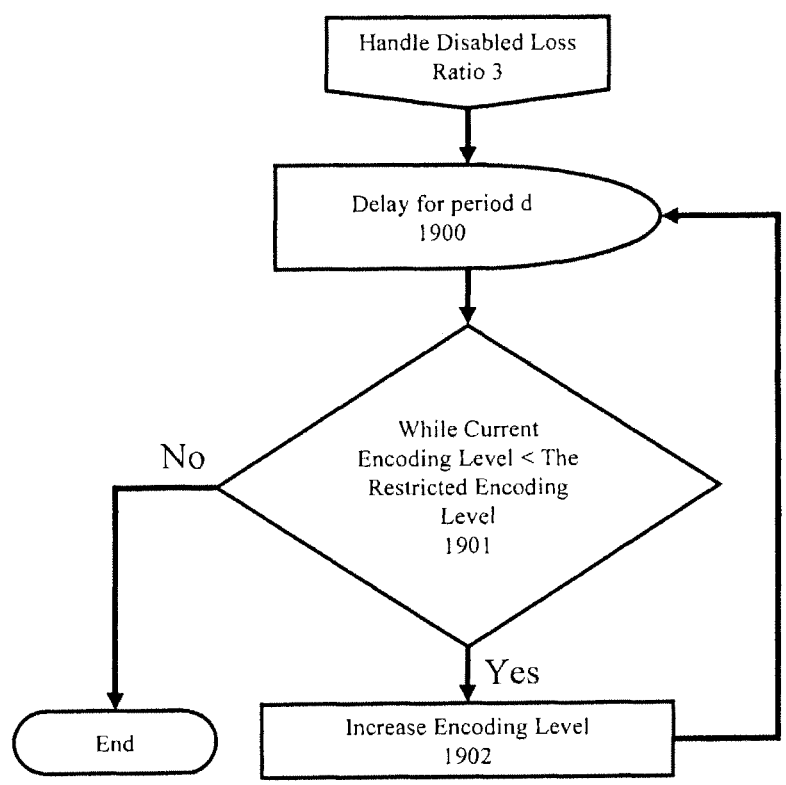
FIG. 13 is a flow chart of an example of handling a restricted encoding level. In this case, the encoding level is increase over a period of time to match the restricted encoding level.

There are a number of ways to determine whether the restriction of the encoding level stabilizes the loss ratio, in step 1301 of FIG. 6. One way depicted in FIG. 11 is to simply exit the algorithm so that the encoding level is never used again while the encoding channel is active. FIG. 12 depicts an alternative technique that delays for a period of time d at step 1800 before re-enabling the encoding level for the encoding channel at step 1801. FIG. 13 depicts another alternative in which the encoding level is slowly adjusted back to the restricted encoding level. The period of time over which this occurs depends upon the delay period d set in step 1900, and the increment used to increase the encoding level in step 1902. Step 1901 compares the current encoding level with the restricted encoding level to determine whether the current encoding level is less than the restricted coding level. As long as the answer is affirmative, the system advances to stop 1902 to increases the coding level. Once the restricted level is achieved, the algorithm exits at step 1903.

Figure 14:
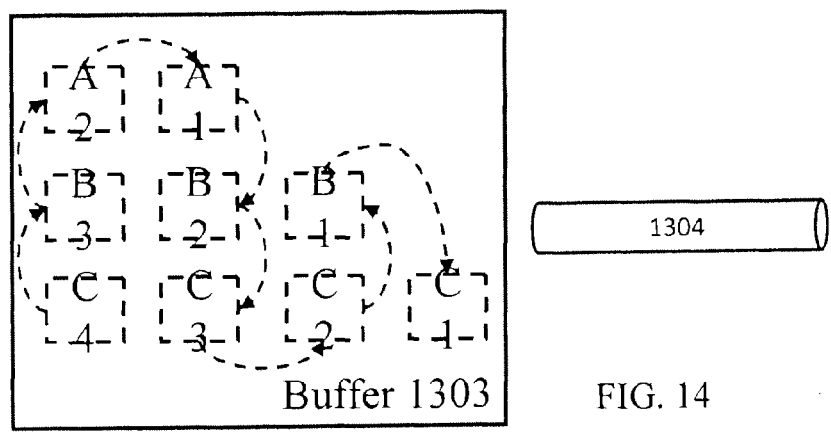
FIG. 14 is a flow chart of an example of interleaved mode according to an embodiment of the present invention.

Another strategy for handling a high level of network loss is to configure the encoder to transmit encoded packets in an interleaved manner (referred to as "interleaved mode"), thereby spreading the risk of losing multiple encoded packets across different standard packets and providing a higher probability of encoded packet re-assembly. Thus, instead of sequentially sending groups of encoded packets such that each group corresponds to a single standard packet, encoded packets from different standard packets are interleaved with one another. FIG. 14 illustrates an example of the interleaving mode. In this example, it is assumed that standard packets A, B, and C are respectively segmented into encoded packets A1, A2; B1, B2, B3; and C1, C2, C3 and C4. Encoded packets A2, B3 and C4 are extra encoded packets. Instead of sending these encoded packets grouped according to their respective standard packets, they are interleaved by groups of k standard packets. In the example of FIG. 14, k=3. The encoder stores the encoded packets corresponding to k standard packets into a buffer 1303. Alternatively, the encoder stores a number of packets that arrive during a predetermined time period or until a packet with time sensitive information is detected (e.g., via deep packet inspection). To avoid reordering, the set of encoded packets is aligned to the left such that the last second data of each standard packet is at the tail and is sent last, and the first encoded packet of each standard packet is at the head and is transmitted first. The encoder transmits on the physical interface 1304 the data units at the head in order of top to bottom, or any order that minimizes sending two consecutive encoded packets from the same standard packet. In the example of FIG. 14, the encoded packets can be sent in the order C1, B1, C2, A1, B2, C3, A2, B3, and C4. Sending all the extra encoded packets last can minimize delay. The interleaving can also be done randomly. The group of packets to interleave can include all the encoded packets transmitted from the interface, or the interleaving group can include encoded packets of the same application (e.g., same channels of a video conference), the same destination or a preconfigured grouping.

Figure 15:
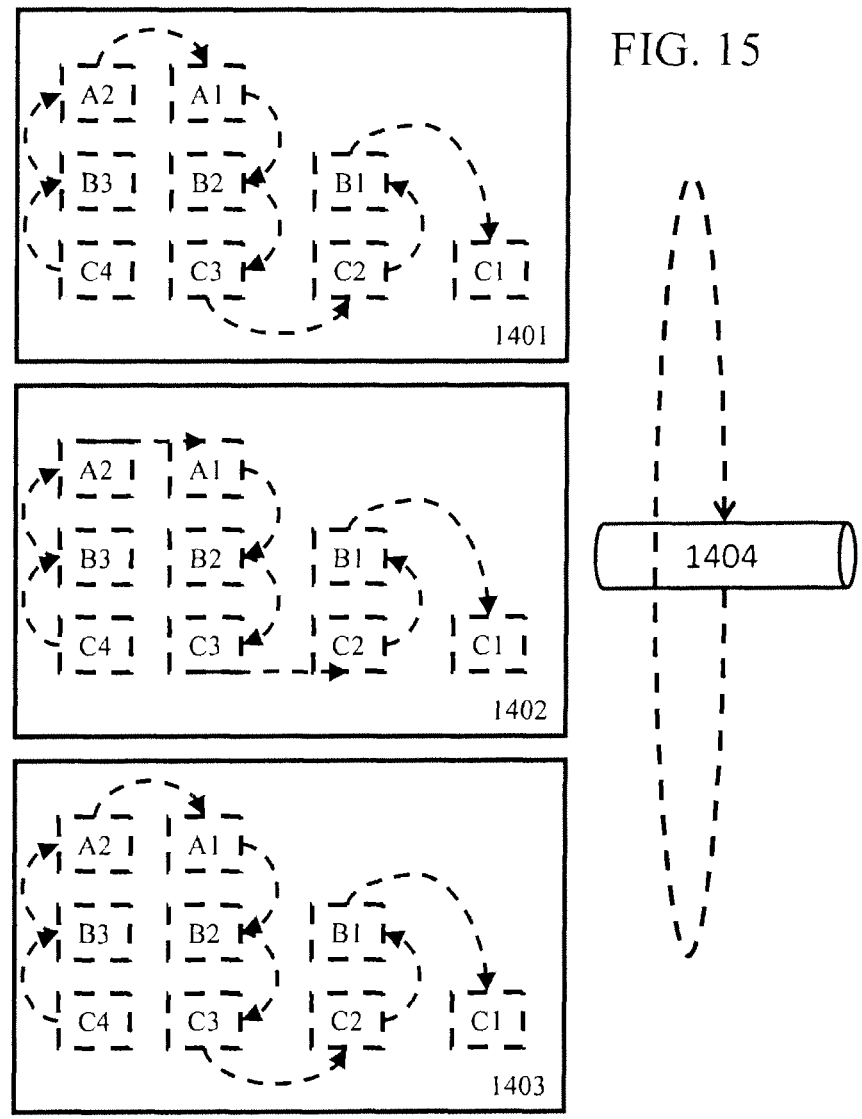
FIG. 15 is a flow chart of an example of multi-level interleaved mode according to an embodiment of the present invention.

In FIG. 15, another level of interleaving is achieved, by interleaving the encoded packets of different interleaved groups 1401, 1402, 1403 of interleaved encoded packets. By such interleaving, the impact of any large loss of data units can be minimized, and, depending on the coding and strategy employed, this type of loss may be recoverable.

Figure 16:
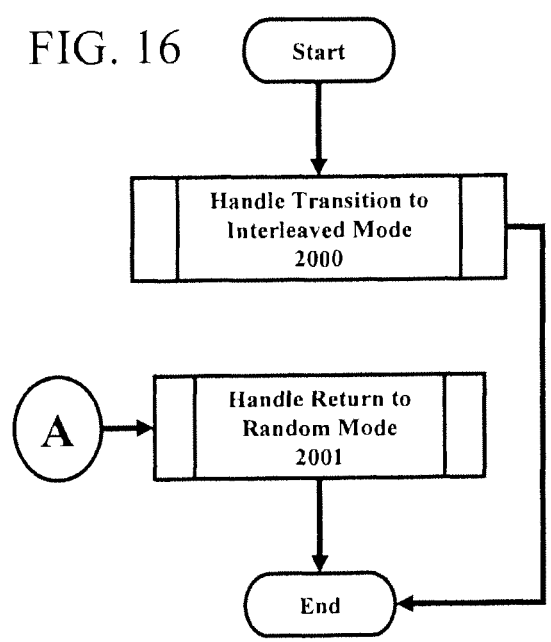
FIG. 16 is a flow chart illustrating the steps executed when the intercepting network device is handling burst loss.

The "interleaved mode" can also be used to address burst loss. Burst loss can be detected if the current loss ratio (i.e., the result of equation (1), (2), (3) or (4)) exceeds the Target Loss Ratio by a predetermined amount (e.g., double). One technique for handling burst loss is illustrated in FIG. 16. When burst loss is initially detected, the loss ratio is debounced. Assuming that the burst loss persists, then a transition to the interleaved mode is executed at step 2000. If the interleaved mode is enabled, the conditions to return to the random mode are checked and verified at step 2001.

Figure 17:
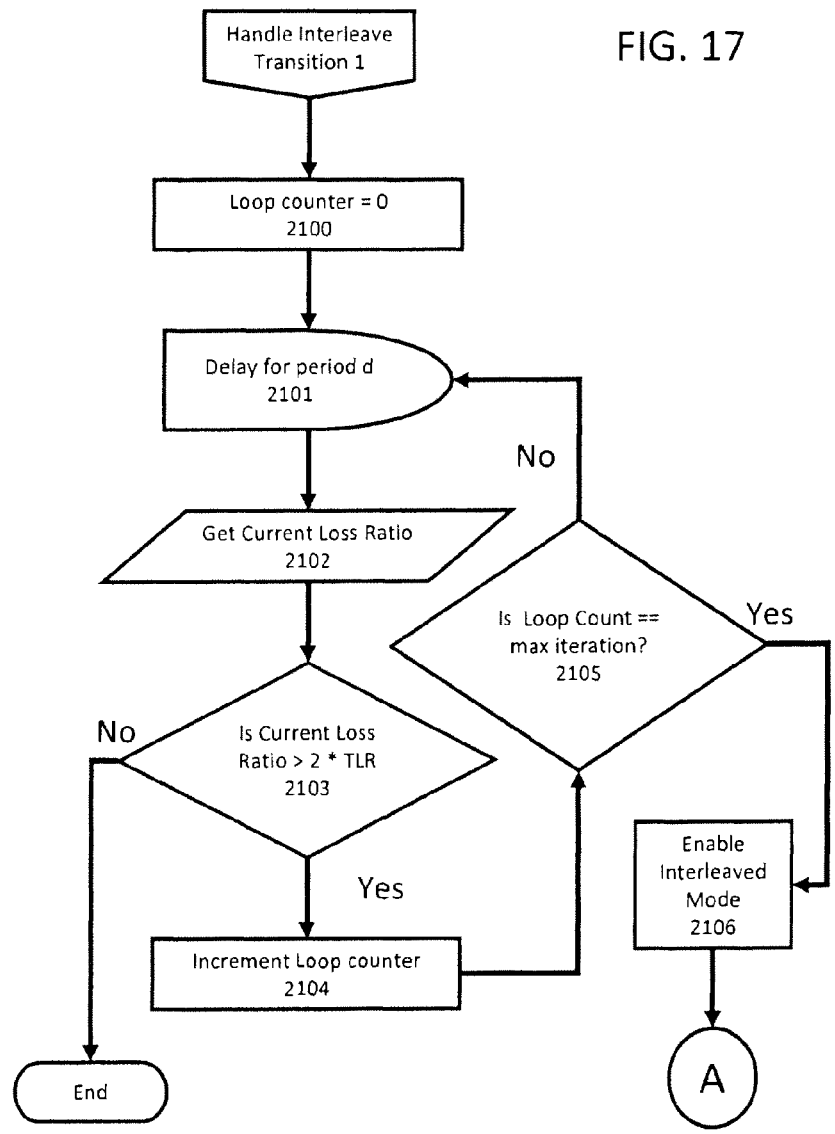
FIG. 17 is a flow chart illustrating the steps executed when the intercepting network device is handling burst loss and interleaved mode is enabled.

An example of how to transition to the interleaved mode is illustrated in FIG. 17. This algorithm debounces the current loss ratio to ensure that the issue persists before enabling interleaved mode. The implementation uses a loop that is initialized at step 2100 and then delays for a time period of d at step 2101. The current loss ratio is retrieved at step 2102 and checked at step 2103 to determine whether the current loss ratio exceeds twice the Target Loss Ratio, which is acceptable for this standard protocol type. An affirmative answer at step 2103 causes the loop counter to be incremented at step 2104, and then step 2105 determines whether the loop count has reached the maximum iteration. If the answer is negative, the system returns to step 2101 and repeats steps 2102 and 2103. A negative answer at step 2103 ends the routine, and an affirmative answer at step 2105 causes the interleaved mode to be enabled at step 2106.

Thus, assuming that the loss ratio is maintained for delay period d times the max iterations, the queuing is set to the interleaving mode, and the algorithm continues on to handle the return to the random mode. If the loss ratio does not continue to exceed twice the TLR for the application, the algorithm exits and the interleaved mode is disabled.

Returning to the random mode can be implemented by any of several different methods illustrated in FIGS. 18-21. The method actually used for an encoding channel can be selected in several ways. The intercepting network device may be configured with the method to use for all encoding channels. Also, the intercepting network device may have a policy that matches the standard protocol being encoded. Alternatively, the intercepting network devices may negotiate the method to be used when the encoding channel is established.

Figure 18:
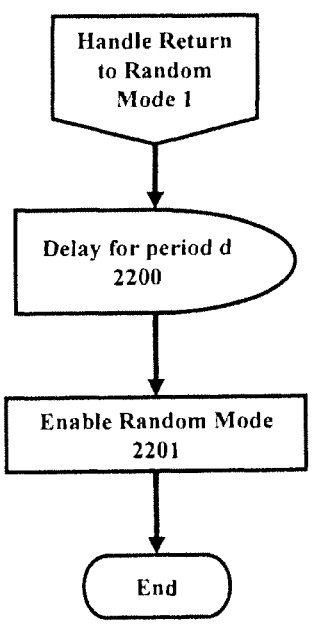
FIG. 18 is a flow chart illustrating the steps executed when the intercepting network device is leaving interleaved mode and random mode is enabled.

FIG. 18 illustrates the most straightforward method for returning to the random mode. In this case, a timer is started at step 2200 when the encoded channel has entered the interleaved mode. When the timer expires, the channel returns to the random mode at step 2201.

Figure 19:
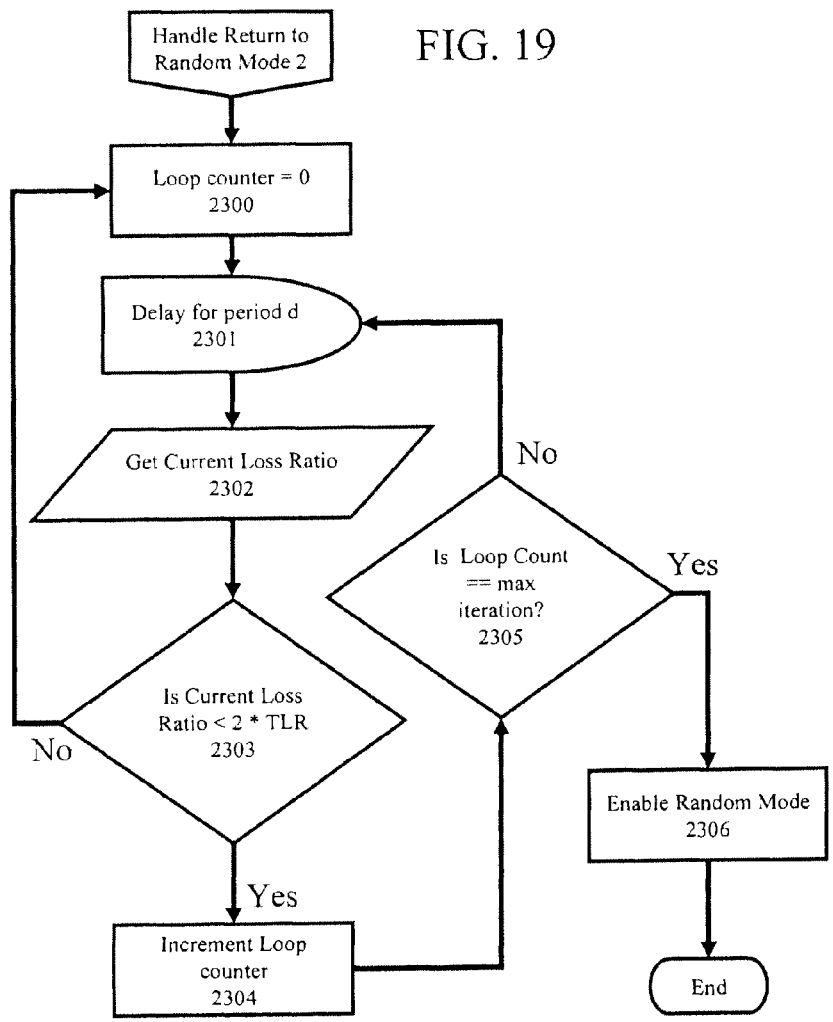
FIG. 19 is a flow chart illustrating an alternate algorithm which is executed when the intercepting network device is leaving interleaved mode and random mode is enabled.

In FIG. 19, the algorithm ensures that the interleaved mode has an effect on the current loss ratio before queuing is returned to the random mode. The current loss ratio must be lower than twice the Target Loss Ratio for a time period of d times the max iterations before the random mode is enabled. To complete this, a loop is used to sample the current loss ratio. The loop is initialized at step 2300 and then waits for a delay period of d at step 2301. The current loss ratio is retrieved at step 2302 and checked at step 2303 to determine whether the current loss ratio exceeds twice the Target Loss Ratio. An affirmative answer at step 2303 causes the loop counter to be incremented at step 2304, and then step 2305 determines whether the loop count has reached the maximum iteration. If the answer is negative, the system returns to step 2301 and repeats steps 2302 and 2303. An affirmative answer at step 2305 causes the random mode to be enabled at step 2306.

Figure 20:
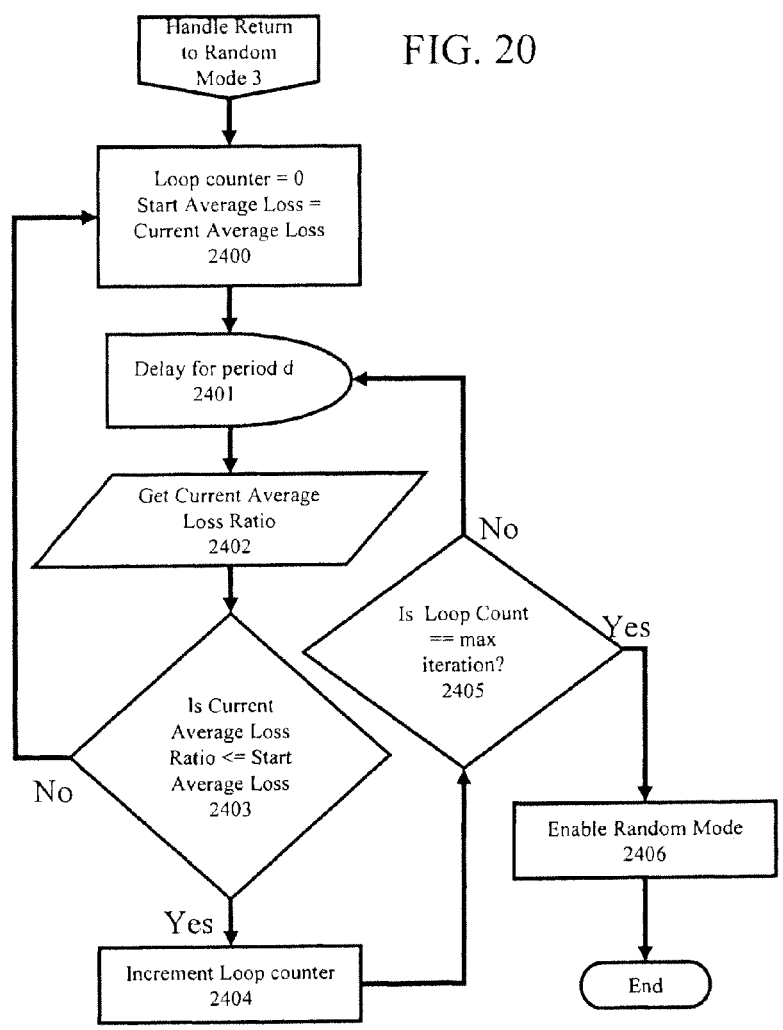
FIG. 20 is a flow chart illustrating another alternate algorithm which is executed when the intercepting network device is leaving interleaved mode and random mode is enabled.

FIG. 20 is similar to FIG. 19 with the exception that instead of using the current loss ratio, the average loss ratio is used. The loop is initialized at step 2400 by setting the loop counter to zero and setting the Start Average Loss to the Current Average Loss and, the system then waits for a delay period of d at step 2401. The current average loss ratio is retrieved at step 2402 and checked at step 2403 to determine whether the current average loss ratio exceeds the Start Average Loss. An affirmative answer at step 2403 causes the loop counter to be incremented at step 2404, and then step 2405 determines whether the loop count has reached the maximum iteration. If the answer is negative, the system returns to step 2401 and repeats steps 2402 and 2403. An affirmative answer at step 2405 causes the random mode to be enabled at step 2406.

Figure 21:
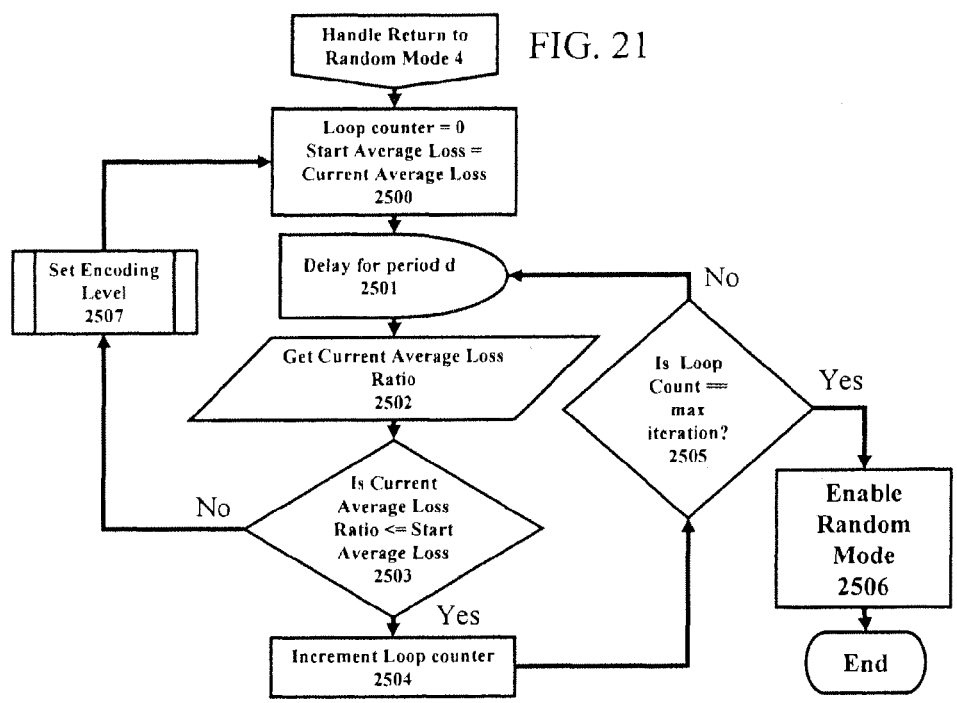
FIG. 21 is a flow chart illustrating another alternate algorithm which is executed when the intercepting network device is leaving interleaved mode and random mode is enabled.

FIG. 21 is similar to FIG. 20, except that changing the encoding level is also allowed. The loop is initialized in step 2500 by setting the loop counter to zero and setting the Start Average Loss to the Current Average Loss and, the system then waits for a delay period of d at step 2501. The current average loss ratio is retrieved at step 2502 and checked at step 2503 to determine whether the current average loss ratio exceeds the Start Average Loss. A negative answer at step 2503 adjusts the encoding level at step 25607 to handle the current average loss ratio and then returns to step 2500. An affirmative answer at step 2503 causes the loop counter to be incremented at step 2504, and then step 2505 determines whether the loop count has reached the maximum iteration. If the answer is negative, the system returns to step 2501 and repeats steps 2501-2503. An affirmative answer at step 2505 causes the random mode to be enabled at step 2506.

Figure 22:
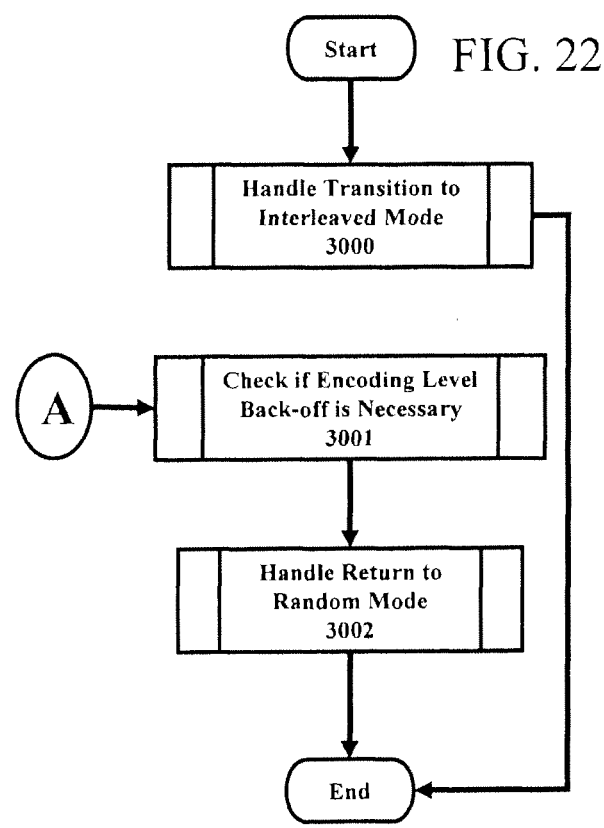
FIG. 22 is a flow chart illustrating the steps executed when the intercepting network device is handling burst loss using interleaved mode and encoding level back-off.

FIG. 22 illustrates an algorithm that combines the handling of both significant changes in the current loss ratio or burst loss exceeding twice the TLR. In this embodiment, the algorithm starts at step 3000 by determining if the encoding channel needs to transition to the interleaved mode. Assuming this is required, the algorithm then checks to see if encoder level back-off is required at step 3001. Regardless of whether back-off is required, the algorithm then determines when the encoding channel transitions back to the random mode at step 3002.

Handling the transition to the interleaved mode in step 3000 can be handled in the same way as in FIG. 18. Step 3002 looks at the transition back to the random mode, using any of the algorithms illustrated in FIGS. 18-21.

Figure 23:
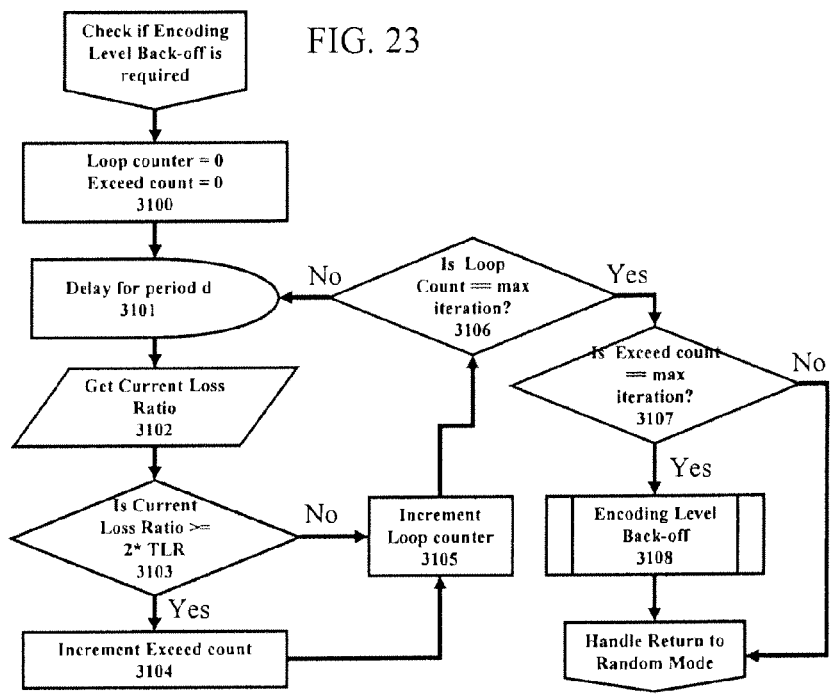
FIG. 23 is a flow chart illustrating the steps to determine if encoding level back-off is required when handling burst loss.

Determining whether back-off is required at step 3002 is illustrated in FIG. 23. This algorithm debounces the effect of transitioning from the random to the interleaved mode. This measurement should be done after an increase in encoding level. It loops for a period of delay d times max iterations and checks the current loss ratio. The loop, initialized at step 3100, has a delay period of d at step 3101. When this dely period expires, the current loss ratio is sampled at step 3102 and compared to twice the TLR at step 3103. If the current loss ratio is greater than twice the TLR, the exceed counter is incremented at step 3104. Otherwise, the loop counter is incremented at step 3105. This process continues until the loop counter reaches max iterations at step 2506. At this point, the exceed counter is checked at step 2507, and if it equals max iterations, encoding level back-off is enabled at step 2508. Otherwise, the algorithm proceeds on to handle the return to the random mode.

Figure 24:
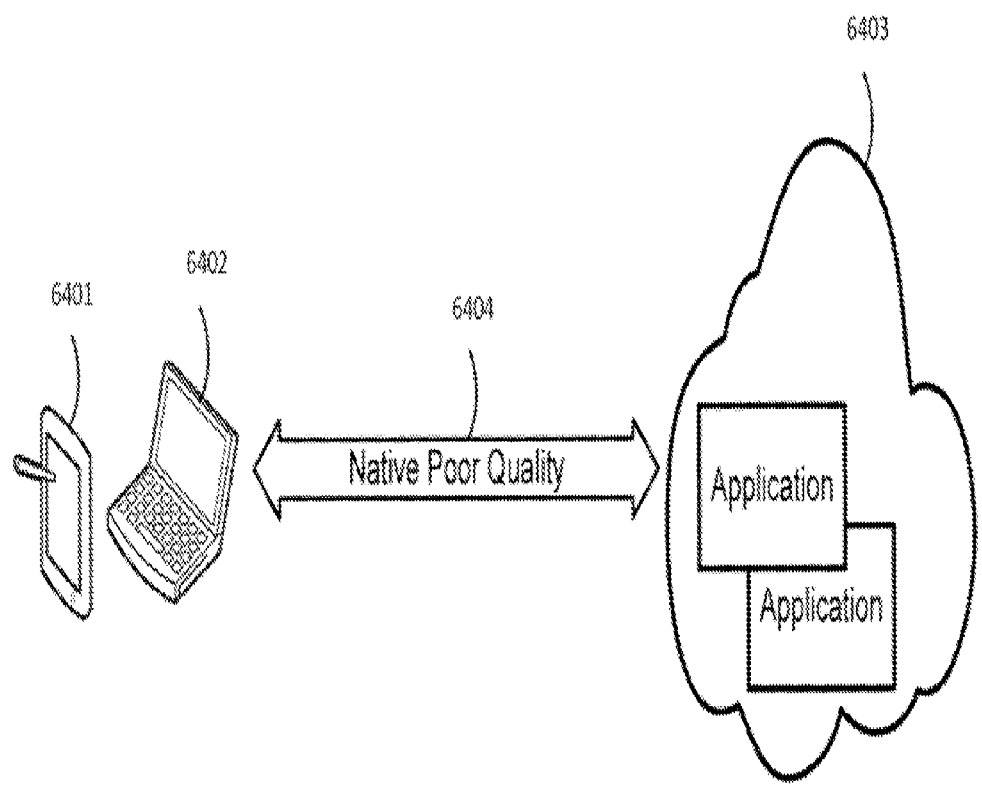
FIG. 24 is a representation of an existing network without performance enhancement.

In FIG. 24, devices 2401, 2402 access application servers 2403 using native, poor quality, network connections 2404 with unreliable network performance. Examples of application servers 2403 are Youtube™ servers, and servers for group video messaging systems. The group video messaging service is further described in the section below titled "A Group Video Messaging Service."

There exist several Network Performance Enhancing Coding techniques (NPEC). NPEC comprise any network coding techniques that use an encoder at one location and a decoder at a second location and wherein the performance of the network in the segment located between the encoder and the decoder is improved. NPEC include, for example the NPEC described above, as well as those described in U.S. Pat. No. 7,706,365 and U.S. Patent Publication No. 2011/0149087 or any other similar methods. NPEC generally require bookending, which means there needs to be an encoder/decoder pair at one end and a decoder/encoder pair at another end to handle bi-directional connections, because these techniques generally modify the standard protocols and the packets would not be recoverable if there is not a matching decoder on the other side.

Figure 25:
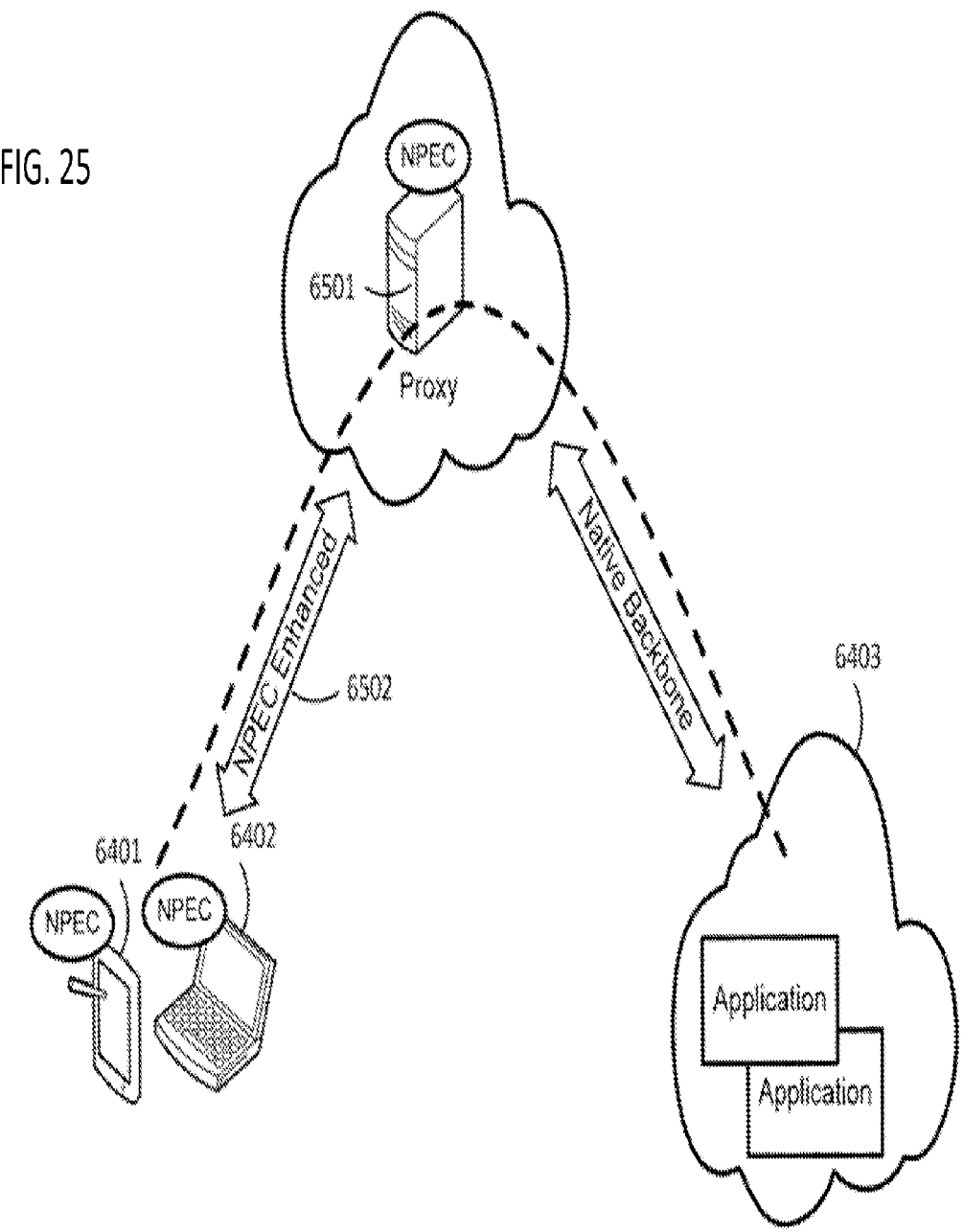
FIG. 25 is an example of a proxy server implementing performance enhancements.

FIG. 25 illustrates an embodiment where it is not possible to put the NPEC at the application server end. A proxy server 2501 is added in the network to implement the encoding/decoding of one or more NPEC mechanisms. Traffic is routed via the proxy server and the network segment 2502 between the device 2401, 2402 and the proxy server 2501 (usually the access network) is encoded/decoded based on a selected NPEC specification implemented in the proxy server 2501. As a result, the network segment has increased performance and reliability.

The proxy server 2501 may be collocated co-located with the application server 2403 such that there is minimum further performance degradation. In another embodiment, an NPEC server is deployed collocated co-located with a proxy server.

Using the NPEC described above in a proxy server, backup applications can reduce the backup time by 80%. Disaster recovery can be improved by 5 times and large file transfers can be reduced by 6 times.

Figure 26:
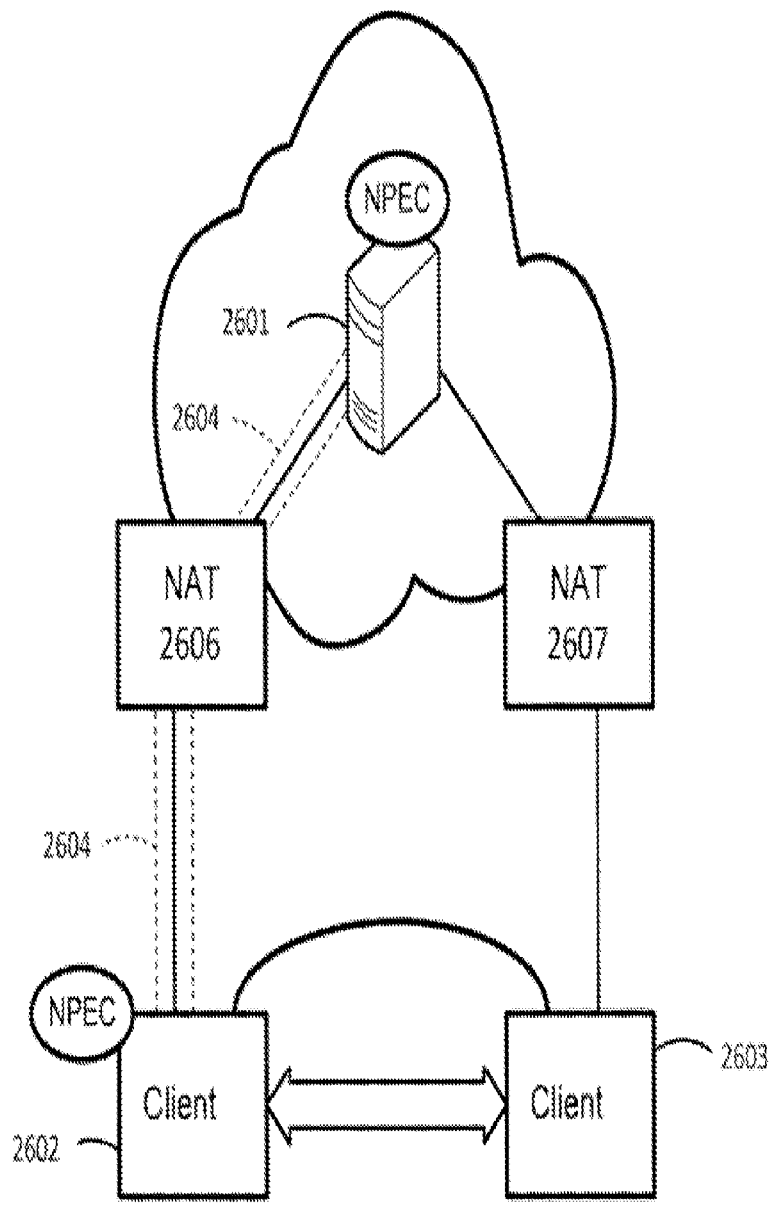
FIG. 26 is an example of a TURN server with added performance enhancements.

Traversal Using Relays around NAT (TURN) is a protocol that allows for an element behind a Network Address Translator (NAT) or firewall to receive incoming data over TCP or UDP connections. FIG. 26 shows an example where a TURN server 2601 implements an NPEC service and one or both of the clients 2602, 2603 can benefit from the enhanced/reliable quality in the network segment 2604 protected by the NPEC.

Any performance sensitive applications can be designed to implement the encoding/decoding of a NPEC and then access the NPEC service through a proxy server or TURN server. Alternatively, the device may already include one or more NPEC capable driver.

Another embodiment of offering quality as a service is through the use of VPN servers. One or more NPEC encoding/decoding mechanism can be implemented in the VPN server and in the VPN clients so that at least the portion between the client and the VPN server has enhanced quality.

The proxy server embodiment can optionally gather measurements to ensure the performance of the NPEC managed segments is adequate and performance analysis can be done on the measurements to ensure the network engineering is adequate.

A Group Video Messaging Service (GVMS)

This service allows users to share videos within groups of users, known as crews. The user of the group video messaging service (GVMS) may be, but is not limited to, an individual, company, or media organization.

Figure 27:
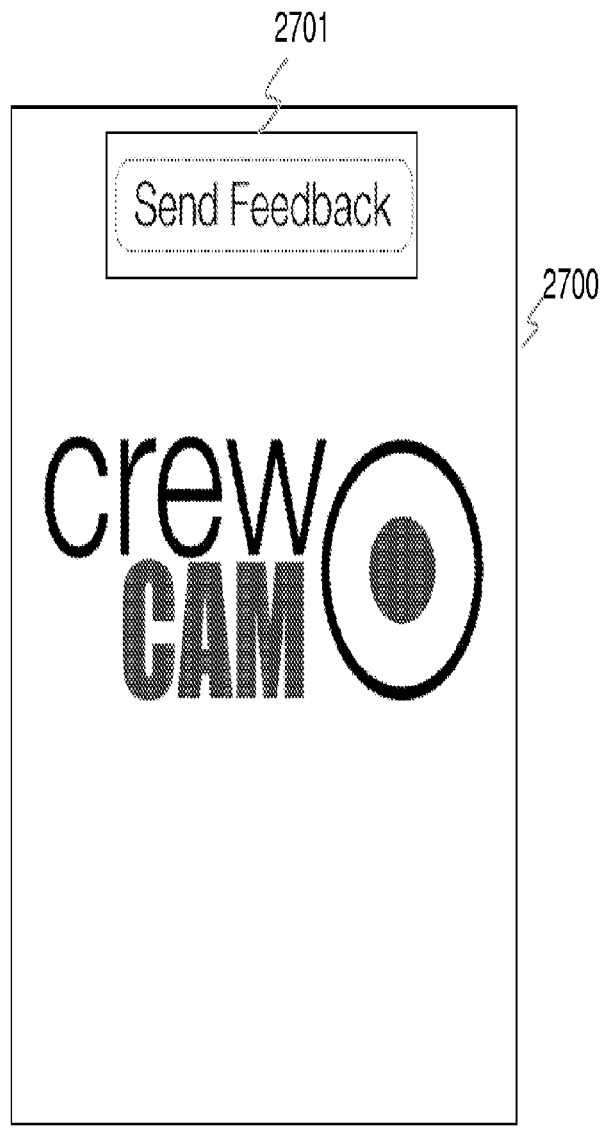
FIG. 27 shows an example landing screen for the group video messaging service (GVMS).

FIG. 27 shows an example landing page or landing screen 2700 for the GVMS. This is the page first presented to a user. It contains "Send Feedback" button 2701, which a user can click on to send feedback to the GVMS system administrators if necessary.

Figure 28:
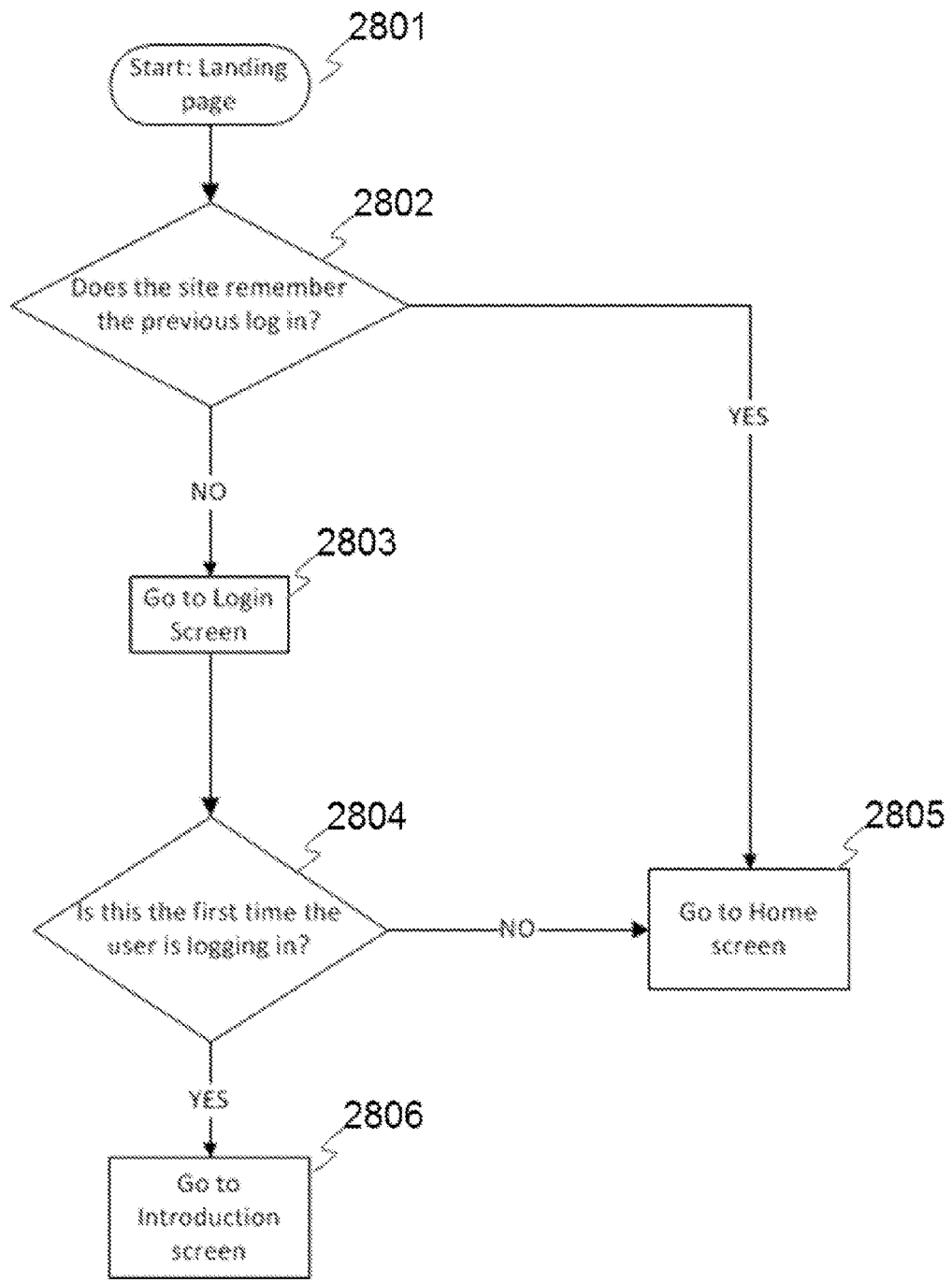
FIG. 28 shows an example of the sequence of events that takes place if a user clicks to enter the GVMS from the landing screen.

FIG. 28 shows what happens if a user clicks to enter the GVMS from the landing page 2700, starting at step 2801. In one embodiment, if the GVMS remembers the previous log in by the user, then the GVMS will go directly to a home page or home screen (step 2802).

Figure 29:
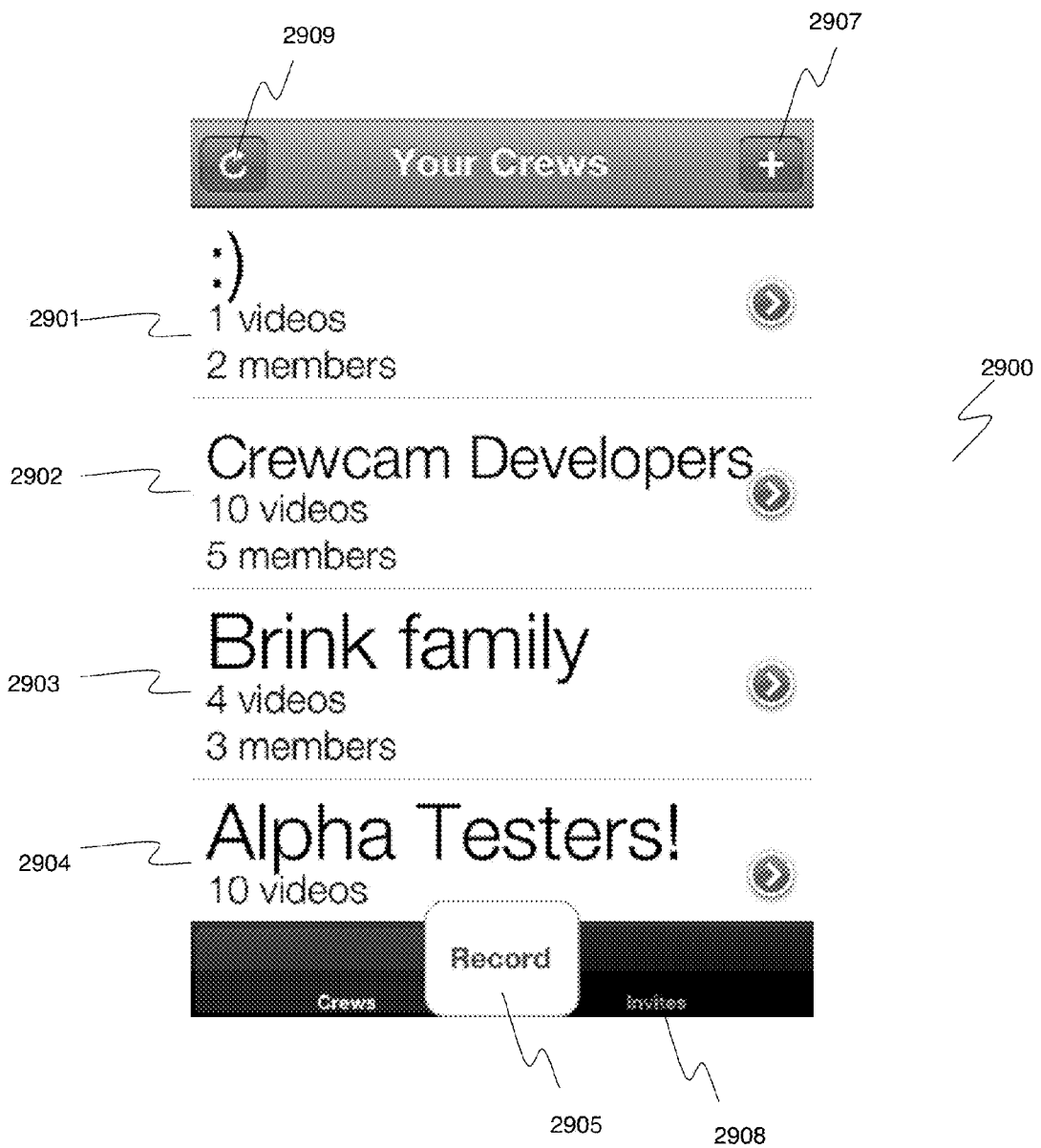
FIG. 29 shows an example home page or home screen for the GVMS.

FIG. 29 shows an example home page or home screen 2900 for the GVMS. Upon logging in, the home page is the first screen presented to a user that has already signed up for the GVMS. FIG. 29 depicts an implementation in which the home screen displays the crews 2901-2904 to which a user is associated. To refresh the home screen, the user may, for example, click on a button for example 2907, swipe, drag, hold, or utilize other similar actions. In this embodiment, the user can add new crews on the home page. (button 2906) On this screen, the user can also record new videos directly from the home page by navigating to "Record" (button 2905) and view invites from other users (button 2908).

The home screen 2900 shown in FIG. 29 is one example of a home screen. In another embodiment, if the user has, for example, purchased credits from the GVMS, the home screen will show the user's remaining balance. In another embodiment, the user can, customize the home screen to his/her preference such as, but not limited to, selecting themes, backgrounds, color schemes, fonts, sorting contacts and crews. The user may optionally also choose to have an "avatar" to represent him/her.

Returning to FIG. 28, the GVMS progresses to step 2802. If in step 2802, the GVMS does not remember the previous log in by the user, because the user log in took place too long ago, or the user has never used the GVMS before, or a previous user had been signed in, or the user had not asked the GVMS to remember him/her, the GVMS will take the user to a login screen (step 2803).

Figure 30:
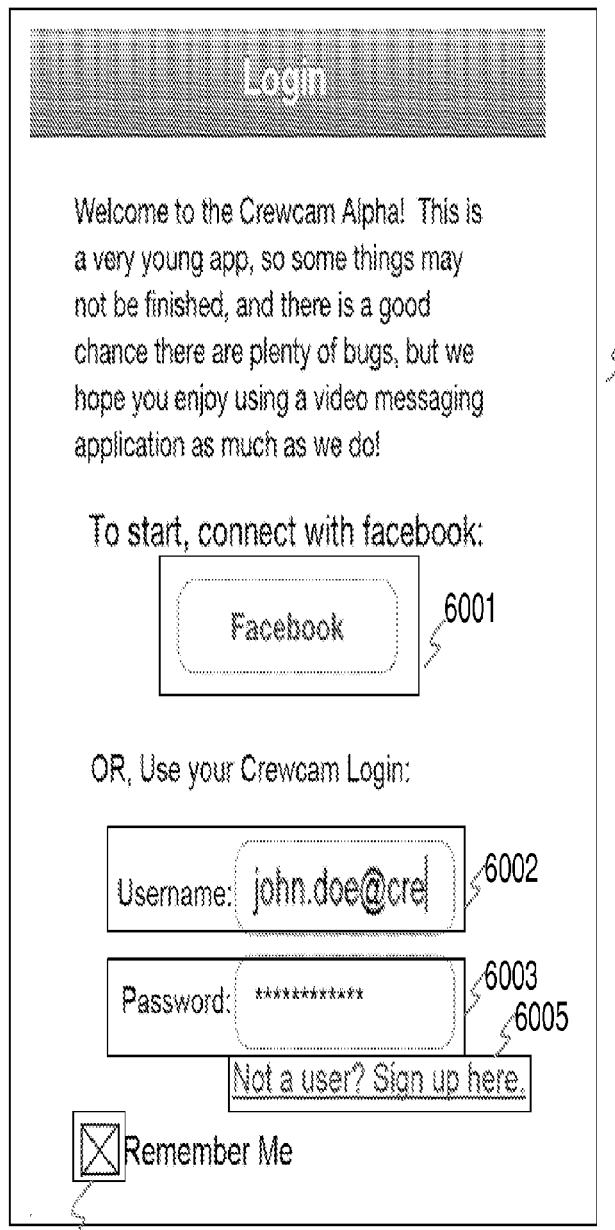
FIG. 30 shows an example login screen.

An example login screen 3000 is shown in FIG. 30. Here, the user can log in. In one embodiment, the user uses login details from another social media site, or web mail site, for example, Facebook®, LinkedIn®, Twitter®, Yahoo®, Google®, Gmail®, or others to login to the GVMS, for example by clicking button 3001. In another embodiment, the user is prompted for login details specific to the GVMS. These login details are stored in a database in the GVMS. If the user is not logging in for the first time, then the user will enter a pre-selected username and password in fields 3002 and 3003 respectively. In another embodiment, the user also has a choice of specifying whether he/she would like the GVMS to remember his/her login details, by checking box 3004. In another embodiment, the user can click on link 3005 if the user is a first time user.

FIG. 30 shows but one example login screen for the GVMS. Other realizations of the login screen are also possible. In another embodiment, the user is additionally asked to recognise a combination of letters, numbers and symbols in an image and enter the combination into a box. In another embodiment, the user is asked a security question, to which the user only knows the answer. In yet another embodiment, the user may be asked additional personal information, such as date of birth and home address. In another embodiment, the user is asked to take a picture of himself/herself and the GVMS will match the image to a pre-stored image.

Referring to FIG. 28, if the user is not a first time user, and had to log in because the GVMS cannot remember the last time he/she logged in, and the login was successful, the user is taken to the home screen 2900 of FIG. 29 (steps 2804 and 2805).

If the user is a first-time user and successfully logs in, using, for example, the login details from another social media or web mail site, the GVMS will take the user to the introduction screen (steps 2804 and 2806).

Figure 31:
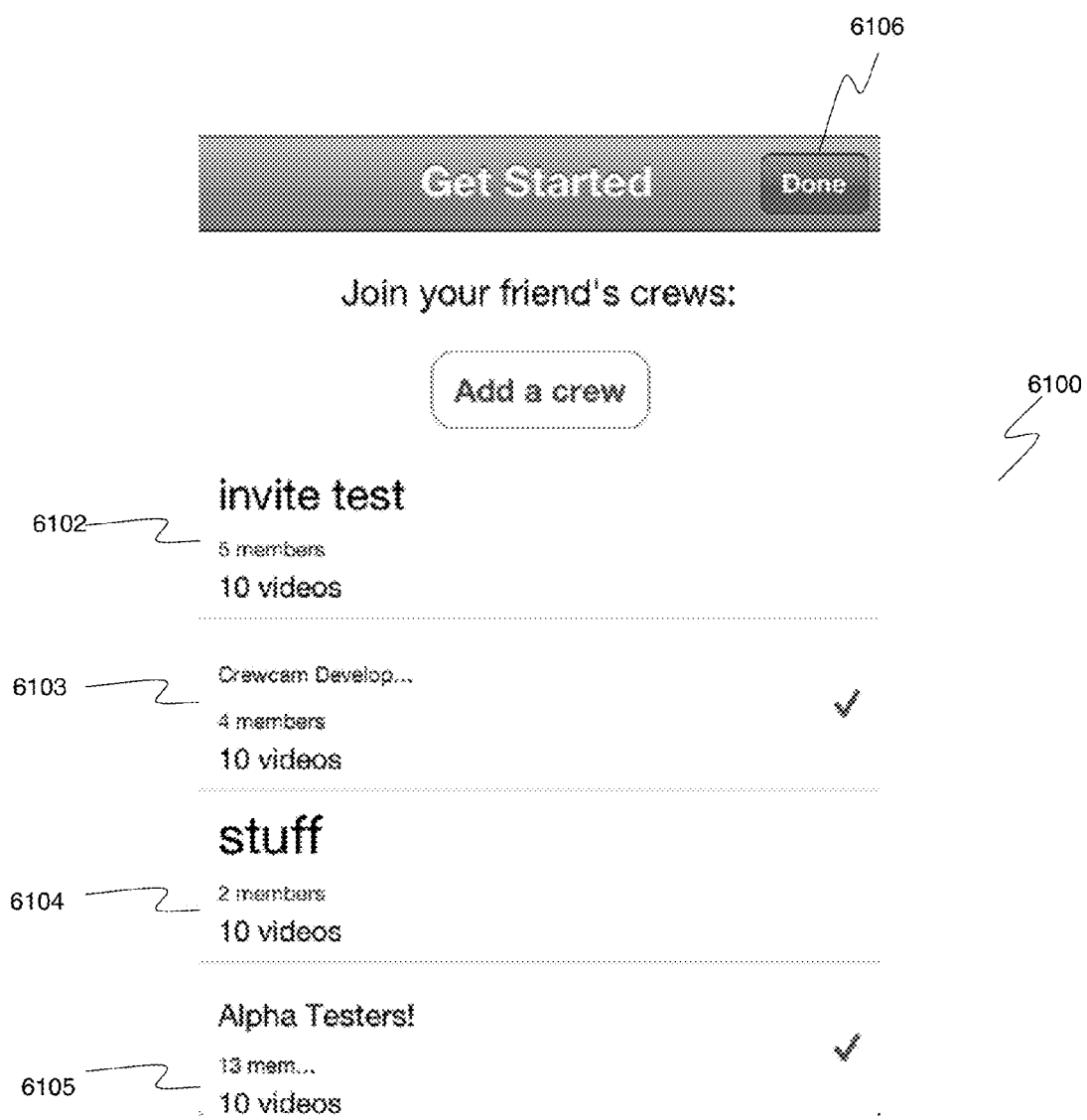
FIG. 31 shows an example introduction screen.

An example introduction screen 3100 is shown in FIG. 31. Here a user can add one or more crews by, for example, clicking on button 3101, or join a crew (for example 3102-3105) that the user has been invited to. Once the user is finished, the user can click on the "Done" button 3106.

FIG. 31 is one example of an introduction screen. Other realizations of the introduction screen are also possible. In one embodiment, the user is given the choice of taking a tour of the GVMS. In another embodiment, the user is asked whether he/she would like to import contact details from his/her smartphone, email program address book, social media site, webmail site. In another embodiment, the user is given the option of linking his/her social media page for example, Facebook®, LinkedIn®, Google® Plus, Twitter® or Pinterest® to the GVMS, so that notifications are sent to these sites. In another embodiment, the user is asked whether he/she would like notifications sent, for example, via email, SMS or automated voice message to a destination of his/her choice.

In another embodiment, if the user is logging in for the first time, and clicks on link 3005 of FIG. 30, then the GVMS will take the user to a registration details screen, which asks a user for registration details. Here, the user can enter information, for example:

Name
A GVMS-specific user name
A GVMS-specific password
A security question, for example,
What is your mother's maiden name?
What is your favourite colour?

The user then enters a preferred answer to this question. When the user logs in, he/she will be prompted to answer this question. If the user forgets his/her password or username, this security question is asked, and the user has to enter the preferred answer.

User tier. In one embodiment, the GVMS has different classes of user for example "Free", "Gold", "Silver" and "Platinum." The GVMS will charge a user different subscription fees for these different classes. For example, the GVMS may not charge the user anything for the "Free" class, but the "Platinum" class may cost the user USD10 a month. If a user chooses a non-free class, then the GVMS will prompt the user for payment details, for example, via credit card or through another mobile payment GVMS.

Date of birth
Address
Telephone numbers for example for work, cellphone, home

Once the user has finished entering these details, the user will be redirected to the login screen of FIG. 30 and prompted to enter his/her GVMS-specific user name and password in fields 3002 and 3003. In another embodiment, the user is additionally asked to recognise a combination of letters, numbers and symbols in an image and enter the combination into a box. If the user is successful, the user is directed to the introduction screen 3100 of FIG. 31.

In another embodiment, when the user first joins the GVMS, the user is logged into an analytics sub-system. From this point forward, every user event is logged with the analytics sub-system, for example, posting a video, inviting a friend to a crew and joining a crew. The analytics sub-system can be internal to the GVMS, or it can be provided by a third party service provider external to the GVMS, such as KISSmetrics®.

Figure 32:
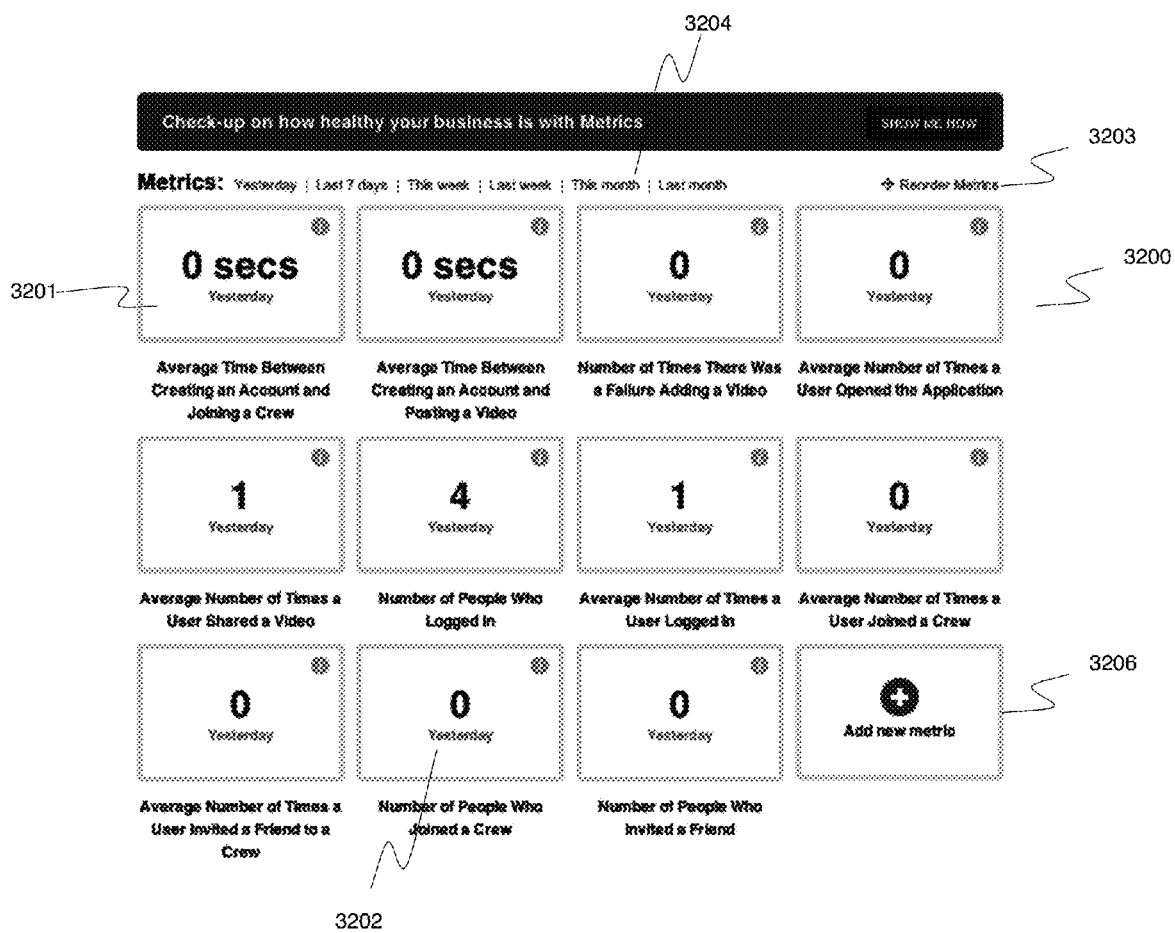
FIG. 32 shows an example of an analytics dashboard.

In another embodiment, the GVMS administrators may be provided with an analytics dashboard generated by the analytics sub-system. An example of an analytics dashboard 3200 is shown in FIG. 32. As can be seen in FIG. 32, several different metrics can be logged by the analytics sub-system on a per-user basis, such as, for example "Average Time Between Creating an Account and Joining a Crew" (display box 3201), and "Number of People Who Joined a Crew" (display box 3202) The GVMS administrators can re-order the metrics in order of importance by, for example, clicking on "Reorder Metrics" (button 3203). The GVMS administrators can also add new metrics (display box 3206) or remove metrics as necessary. The administrators can also decide the period over which user event information needs to be stored, by selecting settings from 3204.

Figure 33:
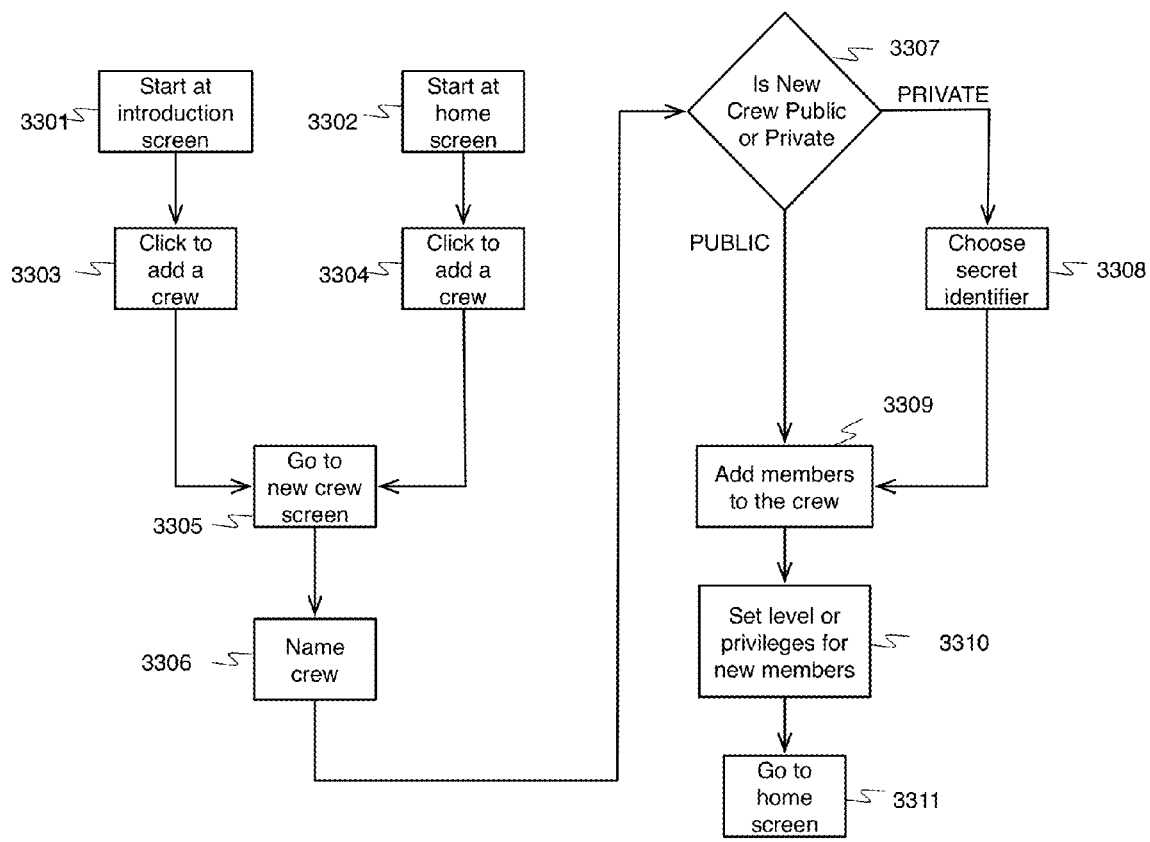
FIG. 33 shows an example of the sequence of events to create a new crew.

Users can also create new crews. In one embodiment, as shown in FIG. 33, a user can create a new crew from either the introduction screen (step 3301) or the home screen (step 3302). If a user chooses to create a new crew from the introduction screen 3300 of FIG. 31, then the user clicks button 3101 to add the crew (step 3303 of FIG. 33). If the user chooses to create a new crew from the home screen 2900 of FIG. 29, the user clicks button 3306 to add the crew (step 3304 of FIG. 33). In both cases, the GVMS will take the user to the new crew screen. (step 3305)

Figure 34:
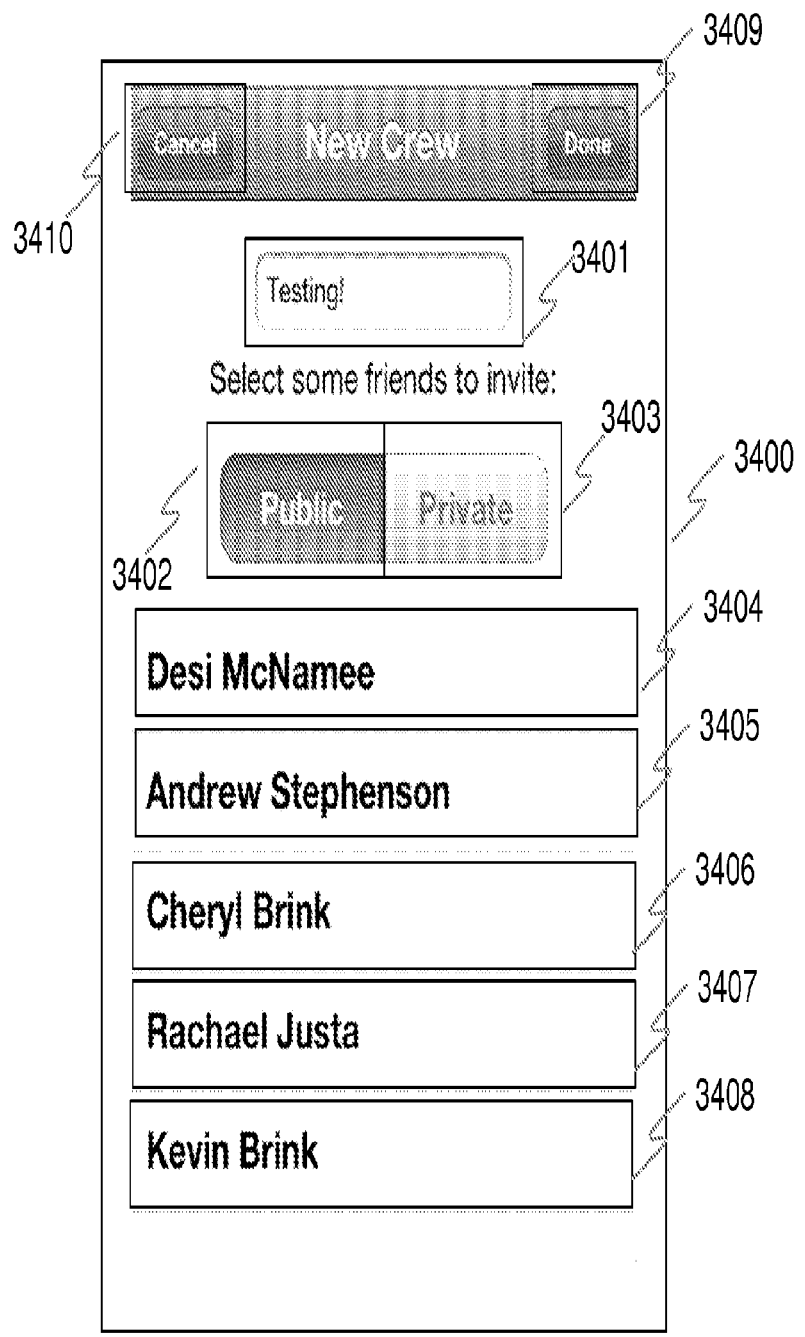
FIG. 34 shows an example of a new crew screen.

FIG. 34 shows an example of a new crew screen 3400. Here the user can carry out step 3306 in FIG. 33, which is naming the crew by filling in field 3401, and decide whether the crew is to be public or private (step 3307 in FIG. 33) by clicking on either button 3402 or 3403.

The new crew screen 3400 shown in FIG. 34 is one example of a new crew screen. In another embodiment, if the user chooses to make the crew private, the user can choose a secret identifier that only crew members would know (step 3308 in FIG. 33). This could be a password, a set of numbers, or any other unique identifying information, such as an image or sound.

The user can then add new members such as members 3404-3408 to the crew (step 3309 in FIG. 33). In one embodiment, when the user adds members to the crew, the user notifies the new members either by sending a message within the GVMS, or by sending messages via other media for example email, SMS, telephone call or voice message.

In a further embodiment, the user sets privileges for new members. (step 3310 in FIG. 33) For example, the user may have multiple tiers of crew memberships, each tier corresponding to a different level of privileges. These privileges include, for example, uploading longer videos, and being able to write longer comments for a given video. The privileges could also include administrative privileges, such as writing guidelines for the crew, being able to expel a member from a crew for not following the guidelines, and approving whether new members can join the crew.

Once this is completed, the user returns to the home screen (step 3311 in FIG. 33). The user can achieve this by, for example, clicking on the "Done" button 3409. When this is done, the user is taken, for example, to home screen 2900 of FIG. 29 where the new crew is displayed along with crews 2901-2904. If the user wishes to abort at any time, the user can click on "Cancel" button 3410.

Figure 35:
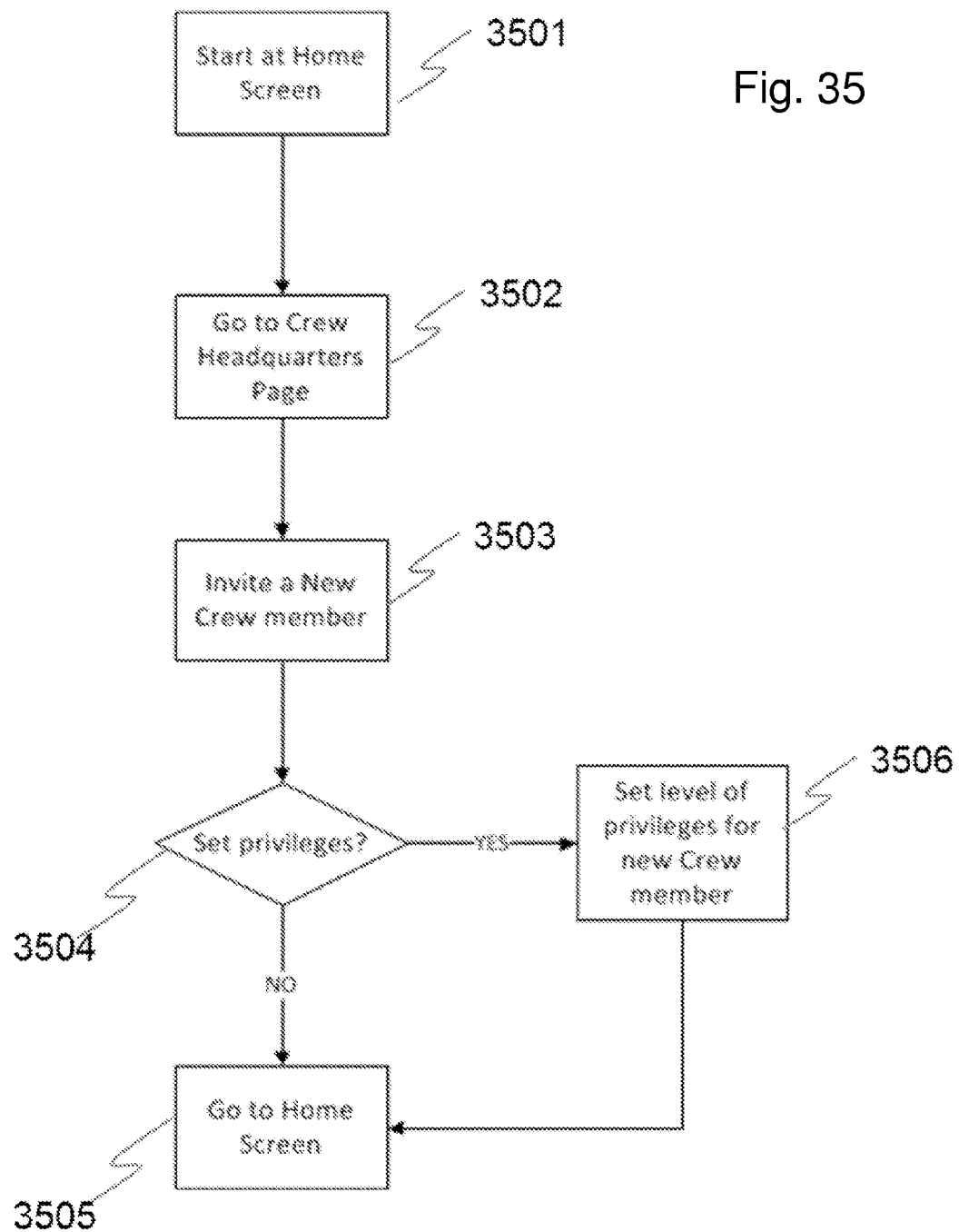
FIG. 35 shows an example of the sequence of events when a user invites new crew members to join an existing crew.

A user can also invite new crew members to join an existing crew of which he/she is a member of. An example of a sequence of events to enable this is shown in FIG. 35. Potential crew members can be drawn from many sources. In one embodiment, users can load friends from a contact list on, for example, a smart phone, a tablet, a laptop or a desktop. In another embodiment, a user can invite friends from other social media websites such as Facebook® or Google® Plus or Pinterest®. Starting from a home screen in step 3501, for example home screen 2900 in FIG. 29, a crew member selects the existing crew, for example crew 2904 "Alpha Testers," that he/she wants to invite the potential new crew member to join. The user is then directed to the crew headquarters page or screen (step 3502).

Figure 36:
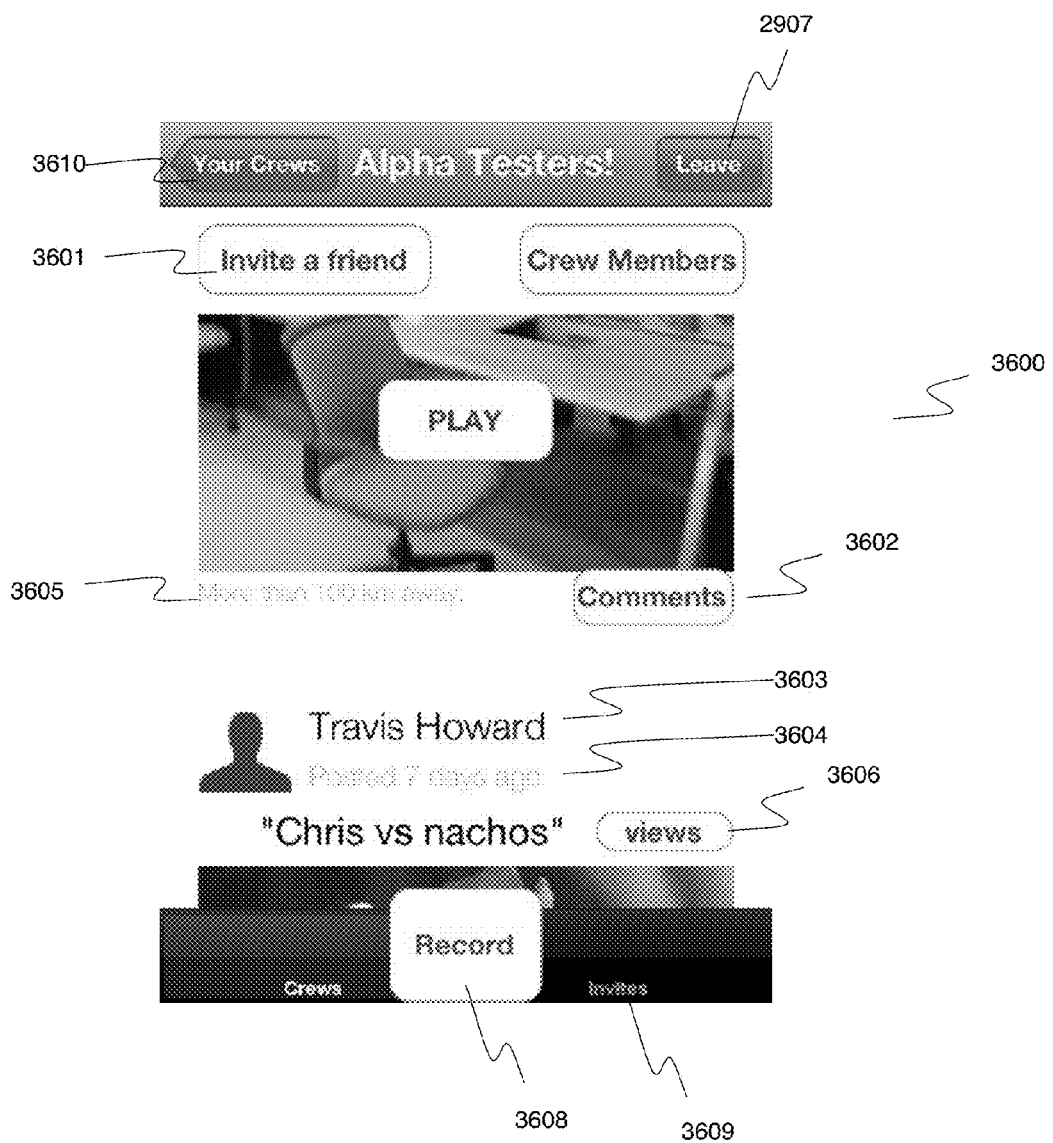
FIG. 36 shows an example of a crew headquarters screen.

FIG. 36 shows an example of a crew headquarters screen 3600. Once there, the user can invite the potential new crew member (step 3503 in FIG. 35) to join crew 2904 "Alpha Testers", by, for example, clicking the "Invite a friend" button 3601. This will take a user to the friend invite screen.

An example friend invite screen 3700 is shown in FIG. 37. Invites can be sent out to potential new members 3701-3705 via, for example, email, SMS, voice mail and instant messaging. In addition, a user can record videos by clicking on the "Record" button 3706.

Referring to FIG. 35, in a further embodiment the user can also set privileges for the new member, if the user so chooses to, and has sufficient privileges to do so (step 3504, 3506). Once the user has completed inviting the new member, the user can return to the home screen (step 3505). Referring to FIG. 37, this can be achieved, for example, by clicking on the "Done" button 3707 on friend invite screen 3700. If the user wishes to abort the process, the user can click on the "Cancel" button 3709.

In another embodiment, potential new crew members are invited by the GVMS to join one or more crews. In one embodiment the invitation is based on one or more common characteristics, such as location, place of birth, hobbies, educational institutions, occupation and interests. For example, if the crew is "Snowboarders of Ottawa" and a person lists their location as Ottawa and snowboarding as an interest, then the GVMS will invite the person to join the "Snowboarders of Ottawa" crew. In one embodiment, information to assess the person's interests, occupation, location and so forth are drawn from one or more social networking websites that the potential new crew member has listed with the GVMS. In another embodiment, potential new crew members who are already signed up for the GVMS are automatically joined or "auto-joined" to a crew by the GVMS. In one embodiment, this "auto-joining" is based on one or more common characteristics. In another embodiment, the information to assess and determine commonalities is drawn from one or more social networking websites such as Facebook®, LinkedIn®, Google® Plus, Twitter® or Pinterest® that the potential new crew member has linked with the GVMS.

The crew headquarters screen enables other functions to be performed. Referring to crew headquarters screen 3600 of FIG. 36, the user can view/playback previous videos that have been shared by other crew members by, for example, clicking on "PLAY" button 3602. The user can also scroll down to view/playback previous videos that have been shared by other crew members, for example, user "Travis Howard" (label 3603). Users can see how old videos are, for example, by reading label 3604 "Posted 7 days ago," or the geographic distance between current location and location an event was recorded, for example, by reading label 3605 "More than 100 km away." Users can check the view statistics associated with a particular video by, for example, clicking on "Views" button 3606. In addition, a user can comment on a particular video by, for example, clicking on "Comments" button 3607. These comments could include text and "emoticons." In addition, a user can record videos by clicking on the "Record" button 3608. If the user chooses to, he/she can also leave the crew headquarters screen and return to a home screen by, for example, clicking on buttons 3610 and 3611.

Crew headquarters screen 3600 in FIG. 36 is one example of a crew headquarters screen. Other embodiments of the crew headquarters screen are also possible. In another embodiment, viewers can indicate whether or not they "like" or "dislike" a video. In another embodiment, a user with sufficient privileges can view the invites which have been sent out by other users. In another embodiment, the crew headquarters screen can be customized to contain a logo unique to the crew. If the crew headquarters screen is, for example, associated with a company, then the company logo can be used. The appearance of the crew headquarters screen can be further customized to include, for example, different backgrounds and colour schemes. In another embodiment, if the user has indicated certain videos are of interest to the user by indicating, for example that certain tags are of interest, then these videos are presented in a separate section, titled, for example, "Videos of Interest."

Figure 38:
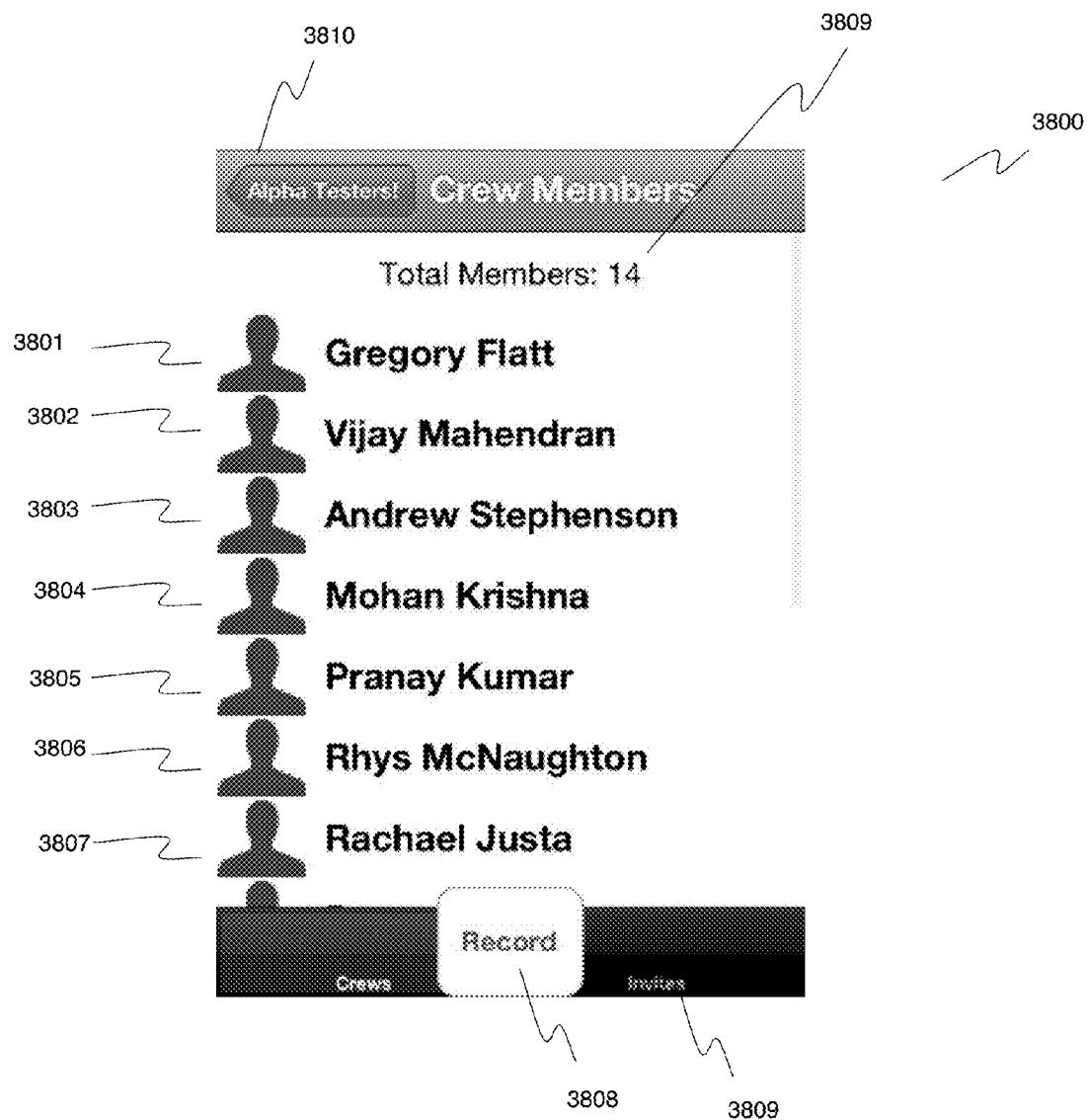
FIG. 38 shows an example of a crew member list screen.

The user can also view a list of crew members from crew headquarters screen 3600 by clicking on button 3612. FIG. 38 shows an example of a crew member list screen 3800. A user can see the total number of members within the crew, for example by reading label 3809 "Total Members", and the names of all the crew members 3801-3807. In addition, a user can record videos by clicking on the "Record" button 3808. The user can return to the crew headquarters screen by clicking on the "Alpha Testers!" button 3810.

FIG. 38 is one example of a crew member list screen. Other embodiments of the crew member list screen are also possible. In one embodiment, a user with sufficient privileges can expel a crew member who has not been following crew guidelines. In another embodiment, a crew member with sufficient privileges may upgrade the user's privileges within the crew.

Figure 39A:
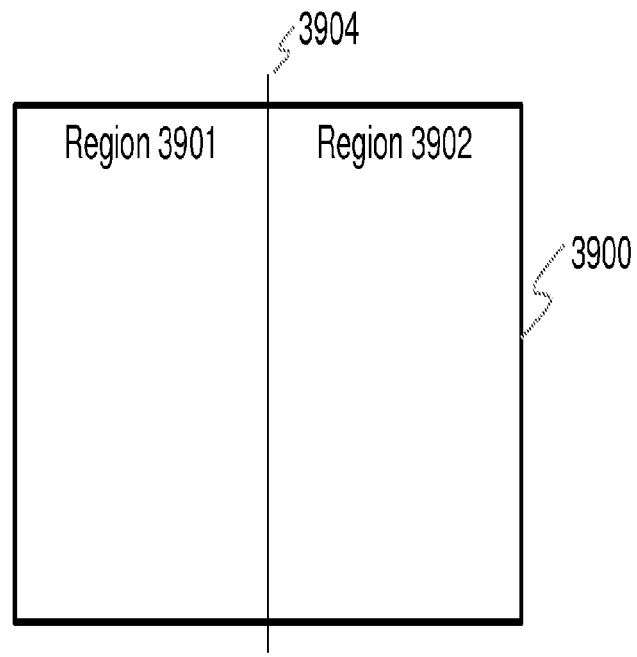
FIG. 39A shows an example of a screen split into 2 parts, where the boundary runs north-south.
Figure 39B:
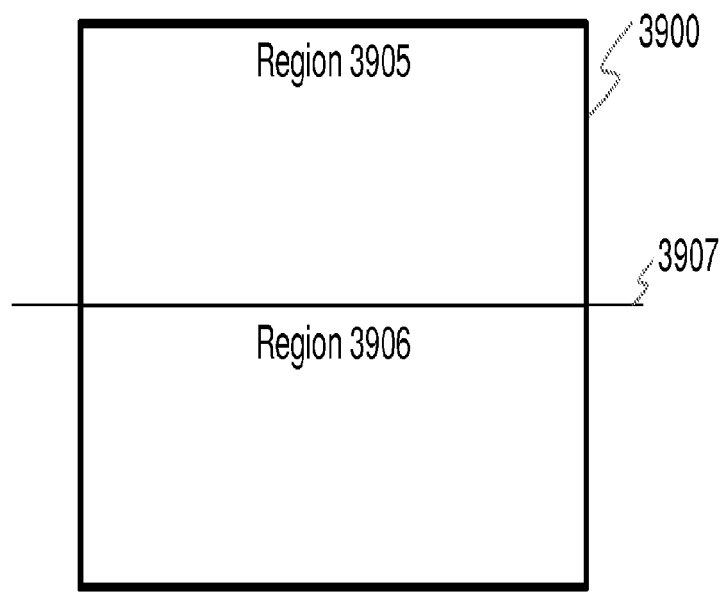
FIG. 39B shows an example of a screen split into 2 parts, where the boundary runs east-west.

To play back a video, a user can go to the crew headquarters screen and play an existing video, simply by clicking play on the video. For example, a user can go to crew headquarters screen 3600 on FIG. 36 and press "PLAY" button 3602. This is just one embodiment of video play back. In another embodiment, the user can also choose multiple videos to play sequentially. In another embodiment, a user can opt to play multiple videos simultaneously on a screen. The screen can be split into 2 or more regions, and the user can view videos simultaneously. FIGS. 39A and 39B show examples of a screen being split into 2 different regions. In FIG. 39A, the screen 3900 is split into regions 3901 and 3902, wherein the boundary 3904 runs from north to south. In FIG. 39B, the screen 3900 is split into regions 3905 and 3906 and boundary 3907 runs from east to west.

Figure 40A:
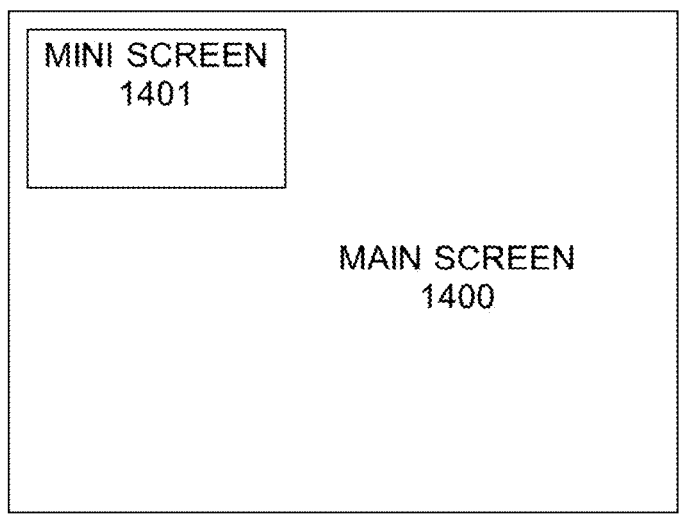
FIG. 40A shows an example "picture-in-picture" configuration where there is one mini screen and a main screen.
Figure 40B:
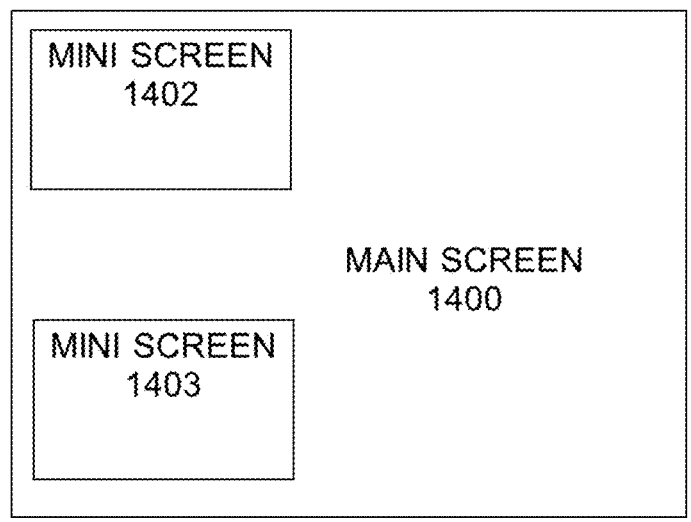
FIG. 40B shows an example "picture-in-picture" configuration where there are two mini screens and a main screen.

In another embodiment, as shown in FIG. 40A, the user may choose to view videos using a "picture-in-picture" configuration, where one video is viewed in a main screen 4000, and the other is viewed using a mini-screen 4001 placed in the corner of the main screen. This is useful, for example, if there is a need for commentary on the video, or if a deaf person wishes to view a video with sign language. In another embodiment, more than one mini-screen can be placed within the same main-screen. FIG. 40B shows an example of two mini-screens 4002 and 4003 being placed within the same main screen 4000. This would enable, for example, expert commentary from two different commentators.

In another embodiment, videos can be overlaid with street map programs, such as Google® Street View. The user can then see where a particular event which was featured in a video took place.

Figure 41:
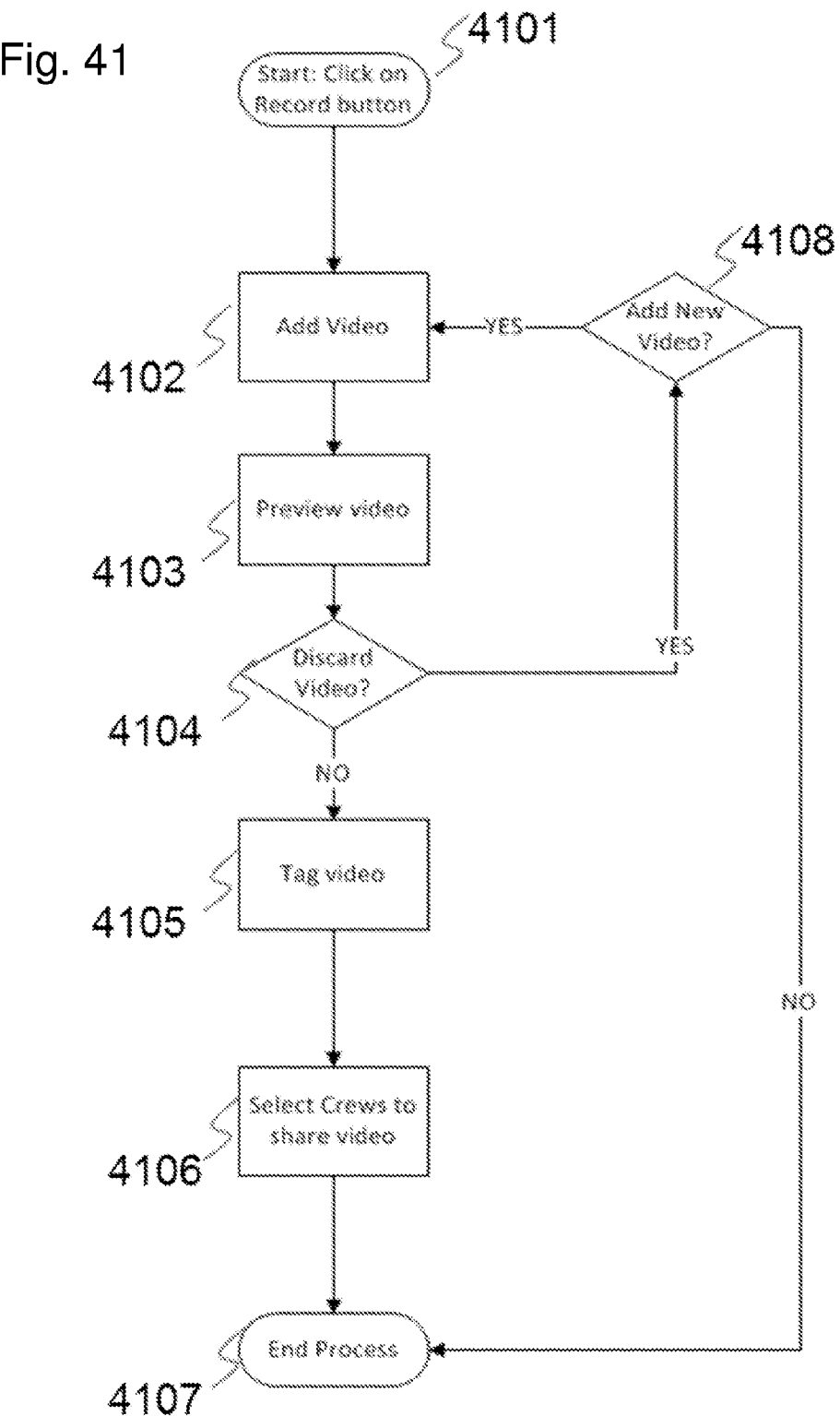
FIG. 41 shows an example sequence of events for a user to add videos to a crew.

A user can add videos to a crew. An example sequence of events is shown in FIG. 41. To begin, the user can click on a button, such as the "Record" button 2905 shown in home screen 2900 in FIG. 29; "Record" button 3608 in crew headquarters screen 3600 in FIG. 36; "Record" button 3706 in friend invite screen 3700 in FIG. 37; and "Record" button 3808 in crew member list screen 3800 in FIG. 38 (step 1501). New videos can then be added in various ways (step 4102). For example, a user may choose to record a new video using, for example, a smartphone, laptop, desktop or webcam. A user can also upload a pre-existing video from a phone, laptop, camera or desktop. A user can also supply a link to an existing video on another web site or on another social media site.

Figure 42:
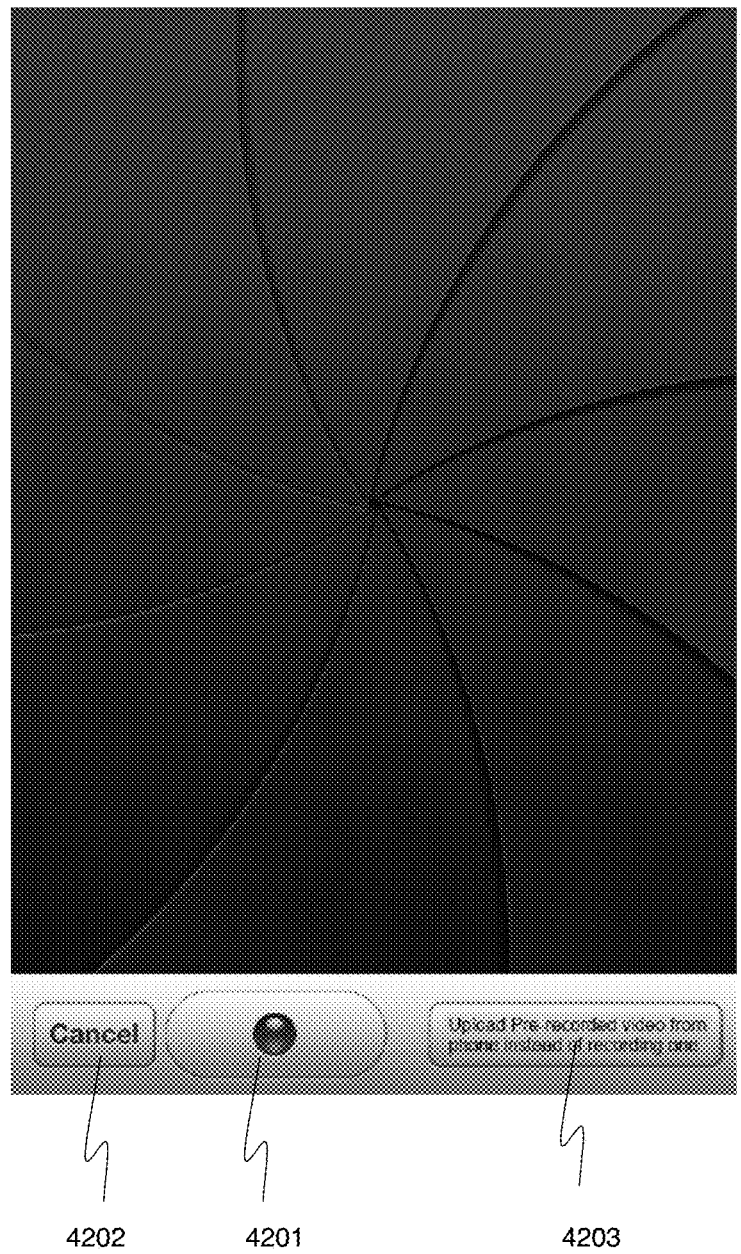
FIG. 42 shows an example of a video recording screen.

If the user chooses to add a video by recording a new video, the GVMS will provide a video recording screen. FIG. 42 shows an example of a video recording screen 4200. The user can click on the button with the red dot 1601 to begin recording a new video. The user can click on the Cancel button 1602 to cancel recording the new video. If the user wants to upload a pre-recorded video from a phone, the user can click on the "Upload pre-recorded video from phone instead of recording one" button 1603. The user can see what he/she is recording through view screen 1604.

Video recording screen 4200 in FIG. 42 is one example of a video recording screen. In another embodiment, in addition to recording from a phone, the video recording screen may allow a user to record a new video using, for example a laptop, camera or desktop. In another embodiment, the video recording screen may allow the user to supply a link to an existing video on another web site or on another social media site.

Once the video is added, the user can preview the video to decide whether to discard or keep the video (step 4103 of FIG. 41). If the user chooses to discard the video, (step 4104 of FIG. 41) then the GVMS can prompt the user to add another video. (step 4108 of FIG. 41)

Figure 43:
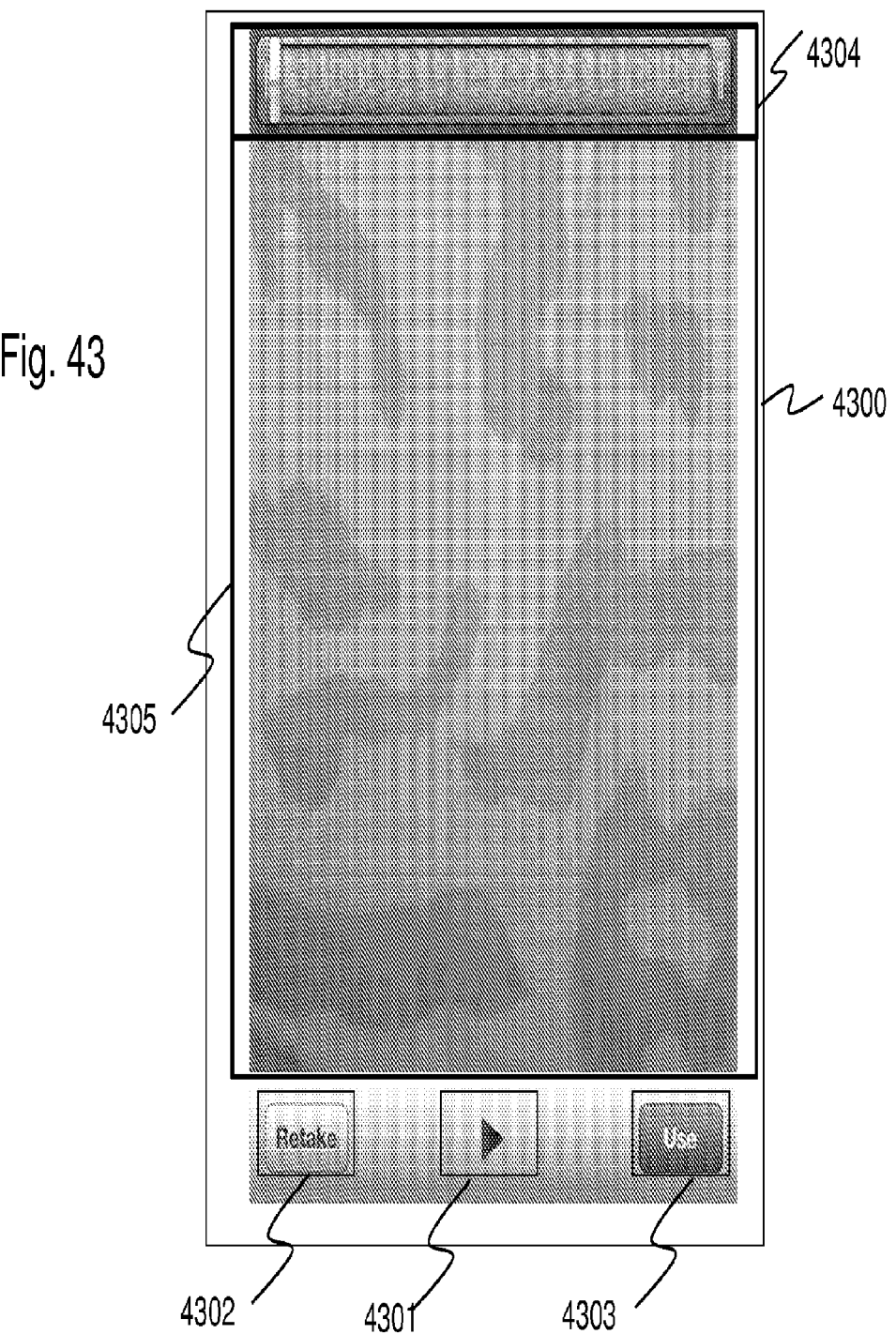
FIG. 43 shows an example of a video preview screen.

FIG. 43 shows an example of a video preview screen 4300. Here, the user can press the triangular shaped button 4301 to view the recently recorded video in area 4305. The bar 4304 at the top of the screen shows the time remaining for the video. Referring to FIG. 41, if the user chooses to discard the video in step 4104, then the GVMS will return the user to the video recording screen 4200 in FIG. 42. Referring to FIG. 43, the user can discard the video by clicking the "Retake" button 4302.

Referring to FIG. 41, in one embodiment, if the user chooses to keep the video, (step 4104) this will take the user to the video sharing screen. Referring to FIG. 43, the user can press the "Use" button 4303 to go to the video sharing screen.

Figure 44:
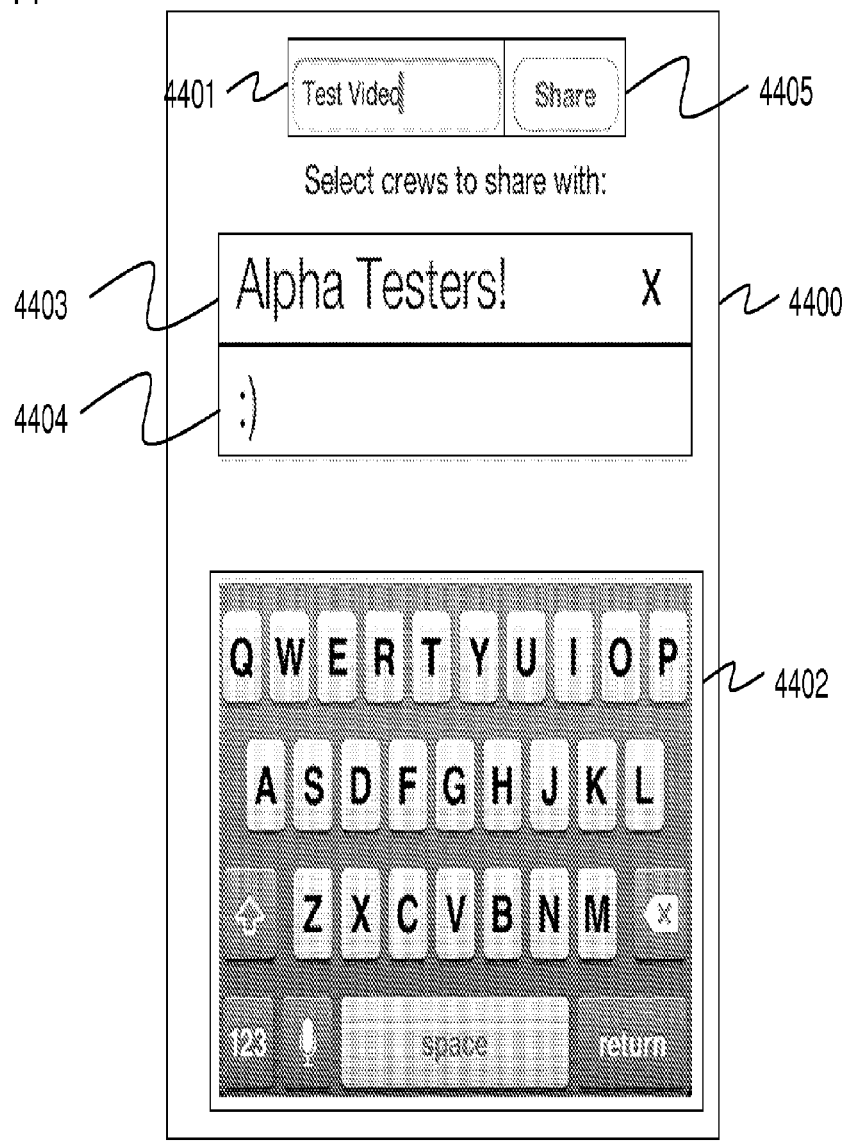
FIG. 44 shows an example of a video sharing screen.

FIG. 44 shows an example of a video sharing screen 4400. The user can then select the crews, for example, crew 4403 "Alpha Testers!" and crew 4404 ":)" to share the video with by inputting the name in field 4401 using the provided keyboard 4402. Once the user has finished inputting the name, the user can click the "Share" button 4405.

While one embodiment has been described in detail here for recording videos, this may not be the only way to add videos. Other embodiments of recording videos are also possible. In another embodiment, if the user chooses to keep the video, the GVMS will prompt the user to tag the video (step 4105 in FIG. 41) to enable, for example, search and retrieval. The video is stored, and indexed by the tags in the database.

The tags can be used in many ways. In one embodiment, a user can select which crews to share the video with based on the tag used. For example, the user can tag the video with an identifier unique to a crew, so that the video is shared with the other crew members immediately.

In another embodiment, other users may indicate that videos containing certain tags are important to them. These videos will then be presented to them first when the user enters the home screen, for example home screen 2900 in FIG. 29.

In another embodiment, the user geo-tags the video, that is, the user tags the video with geographic markers, for example, latitude and longitude. This information is then used to generate information such as label 3605 in FIG. 36, when the crew headquarters screen 3600 is updated. Other users may have indicated that videos from certain locations close to them are important. These uploaded videos can be placed into their feed.

The tags may themselves be visible or invisible. For example, a user may decide to use tags that can only be viewed by his/her crew and are therefore not searchable by others.

Tags can be used to determine searching, uploading and viewing trends. In one embodiment, the GVMS can keep track of which tags are most commonly searched on by all users, or by users belonging to a particular crew, or by a particular user, in a given period. The period can be fixed, or chosen by the user. In another embodiment, the GVMS can keep track of the tags which have been added the most to videos uploaded by all users, or by users belonging to a particular crew, or by a particular user, in a given period. The period can be fixed, or chosen by the user. In another embodiment, the GVMS can keep track of video viewing patterns on a per-tag basis. An example is presented below:

TABLE 1

| Video | Tags | Views |
|---|---|---|
| 1 | dog, cat | 15 |
| 2 | cat, ocean | 11 |
| 3 | dog, silly | 4 |
| Total | | 30 |

Table 1 shows that there were 3 videos, and these videos were viewed a total of 30 times in a given period. Video 1, which had the tags "dog" and "cat", was viewed 15 times; video 2, which had the tags "ocean" and "cat" was viewed 11 times; and video 3, which had the tags "dog" and "silly" was viewed 4 times. Then the following per-tag viewing statistics can also be compiled:

TABLE 2

| Tags | Views |
|---|---|
| Dog | 15 + 4 = 19 |
| Cat | 15 + 11 = 26 |
| Ocean | 11 |
| Silly | 4 |

In Table 2, since the tag "dog" was used to tag videos 1 and 3, which were viewed 15 and 4 times respectively, then videos containing the tag "dog" were viewed 19 times. Similarly, videos containing the tag "cat" were viewed 26 times. Videos containing the tag "ocean" and "silly" were viewed 11 and 4 times respectively. The GVMS can keep track of these per-tag statistics by all users, or by users belonging to a particular crew, or by a particular user in a period of a user's choice. In all these embodiments, tracking can be carried out, for example, by the analytics sub-system, and viewed by system administrators in the analytics dashboard, such as analytics dashboard 3200 in FIG. 32.

In another embodiment, the crew headquarters screen has a section showing which tags have been searched on the most by the crew, and/or which tags have been attached the most to uploaded videos, and/or per tag viewing statistics for a given crew, in a given period. The period can be fixed, or chosen by the user. In another embodiment, the user's home screen has a section showing which tags have been searched on the most by the user, and/or which tags have been attached the most to videos uploaded by the user, and/or per tag viewing statistics for a given user, in a given period. The period can be fixed, or chosen by the user.

In another embodiment, the viewing, searching and uploading trends across the entire GVMS are also shown, for example, in the landing page 2700 or in the home screen 2900. In another embodiment, these trends are stored in a sidebar which the user can activate a sidebar by, for example, activating a button. In one embodiment, the geo-tags are used to plot viewing, uploading and searching trends on one or more maps. These one or more maps are, for example, a world map; country map; map showing a particular region of interest; or a street map such as Google® Map or Google® Street View. In one embodiment, users can pan or select a particular area of interest, and then zoom in on the particular area of interest to see trends. In another embodiment, the user can choose one or more maps to view.

In another embodiment, the GVMS may allow a user to add multiple videos in one session, where the videos come from either a single or multiple sources.

In another embodiment, the GVMS allows the user to reserve different slots for posting videos to a crew. This is useful, if, for example, the user wants to record an event from multiple camera angles then upload the videos to a crew, so that they can be easily played sequentially by another crew member.

In another embodiment, the user can specify which tier level crew members are allowed to view an uploaded video.

In another embodiment, the user can, during video preview, add visual effects to the video. Examples of visual effects include but are not limited to colour filters and slow motion.

In another embodiment, the GVMS may send notifications to a user if a video is posted for one of the crews that the user is a part of. These notifications may be sent, for example, via email, text message, voice message or any other messaging media.

In another embodiment, it may be possible to have videos for crews indicated as public be posted to other social media and video-sharing websites, for example, Facebook®, LinkedIn®, Youtube® and Viddy®.

Figure 45:
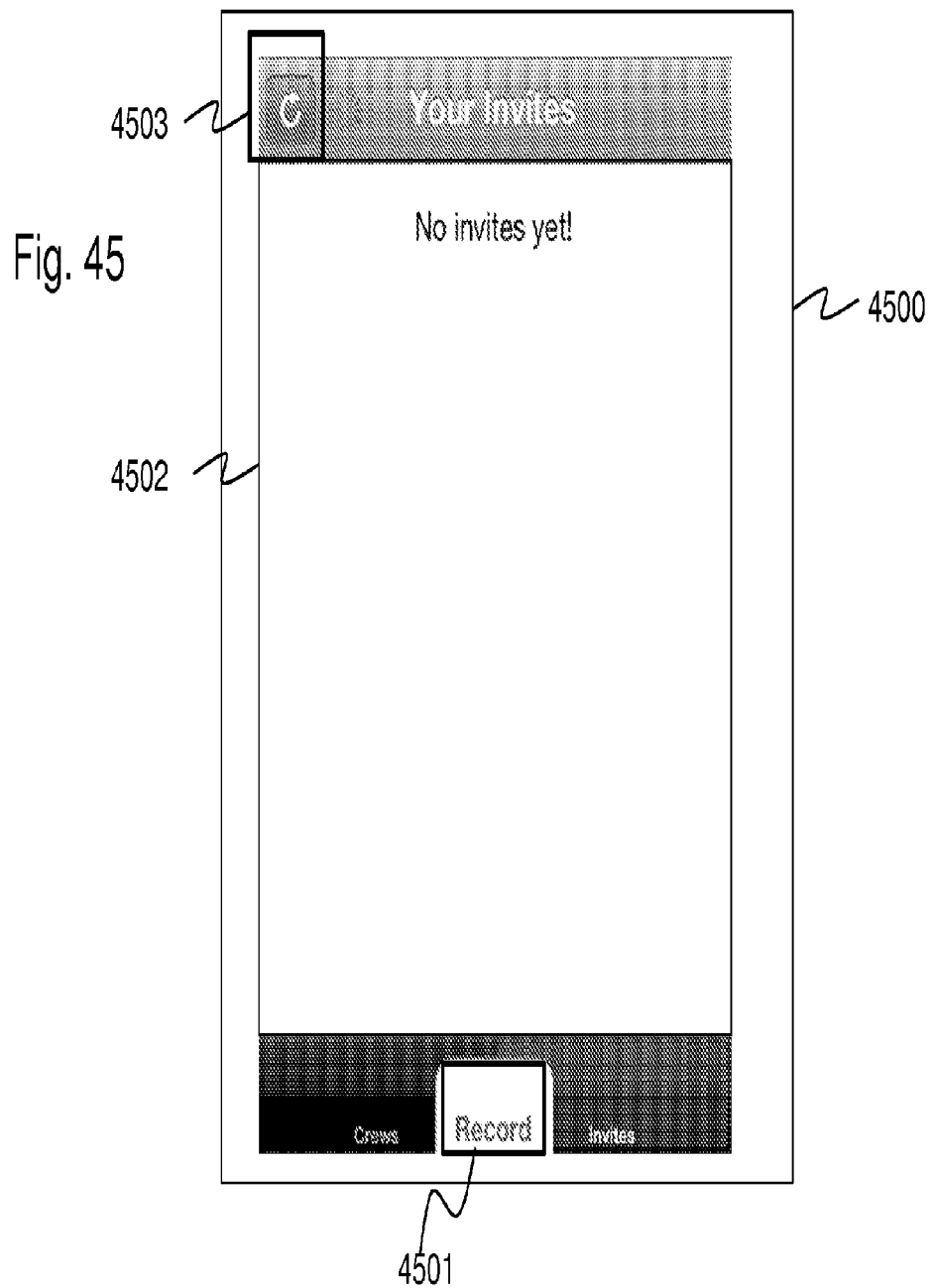
FIG. 45 shows an example of an invite management screen.

FIG. 45 shows an example of an invite management screen, which can be accessed by clicking, for example, the Invites button 2908 located on a home screen 2900 in FIG. 29, the Invites button 3609 located on the crew headquarters screen 3600 in FIG. 36, the Invites button 3708 located on the invite member screen 3700 in FIG. 37, the Invites button 3809 located on the crew member list screen 3800 in FIG. 38

Figure 46A:
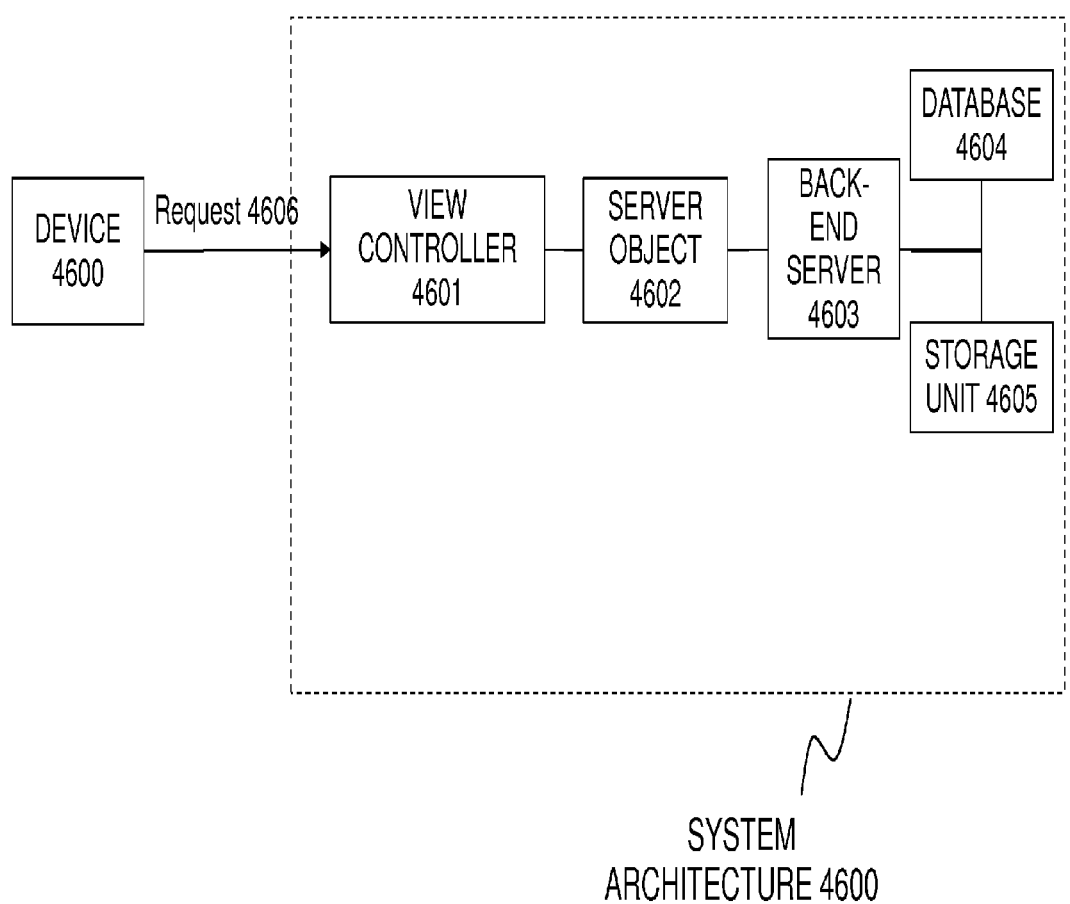
FIG. 46A shows an example of a sub-system to perform data retrieval in response to a request from a device.

FIG. 46A shows an example of an overall system architecture 4600 to perform various functions. These functions include but are not limited to:

Data retrieval for example, playing of videos;

Generation of user interfaces, such as the various screens and the user interface controls located on those various screens, described above, for example:
- the landing screen 2700 in FIG. 27,
- the home screen 2900 in FIG. 29,
- the introduction screen 3100 in FIG. 31,
- the login screen 3000 in FIG. 30,
- the new crew screen 3400 in FIG. 34,
- the crew headquarters screen 3600 in FIG. 36,
- the invite screen 3700 in FIG. 37,
- the crew member screen 3800 in FIG. 38,
- the video recording screen 4200 in FIG. 42,
- the preview screen 4300 in FIG. 43,
- the video sharing screen 4400 in FIG. 44, and
- the video preview screen 4500 in FIG. 45;

Uploading of videos, as described previously, including adding of new videos;

Viewing/playback of videos, as described previously;

Login of authorized users, as described previously;

Registration of new users, as described previously; and

Sending data back to the user.

in response to a request 4606 from a device 4600 initiated by a user. The device 4600 includes but is not limited to a smartphone, laptop, desktop, tablet or any device. The request 4606 could be sent to the system architecture by various networking means, including but not limited to the Internet, local area network (LAN), wide area network (WAN), intranet, satellite, personal area network (PAN).

The system architecture comprises:

The view controller 4601 (which presents information to the server);

The server objects 4602 (such as users, videos or crews);

A back-end server 4603, which is connected to the view controller 4601, server object 4602, database 4604 and a storage unit 4605. The connection could occur, for example, over a network, such as an Ethernet, wide area network, or any form of connection known in the art;

A database 4604, which is where information such as user records, crew records, tags and other such data is stored. The database could be implemented on a separate server, or within the back-end server; and A storage unit 4605, where videos which have been uploaded are stored. This could, for example, be a storage area network, a bank of several hard drives, a data center or any other form of storage known in the art.

Each of these items (view controller 4601, server objects 4602, back-end server 4603, database 4604 and storage unit 4605) could be implemented within a single geographic location or distributed over multiple geographic locations, wherein the locations are connected to each other using, for example, a high speed network, a satellite network, or a fibre optic network. In addition, some combination of these items are implemented on different servers or computers, or all these items are implemented within a single server/computer.

Figure 46B:
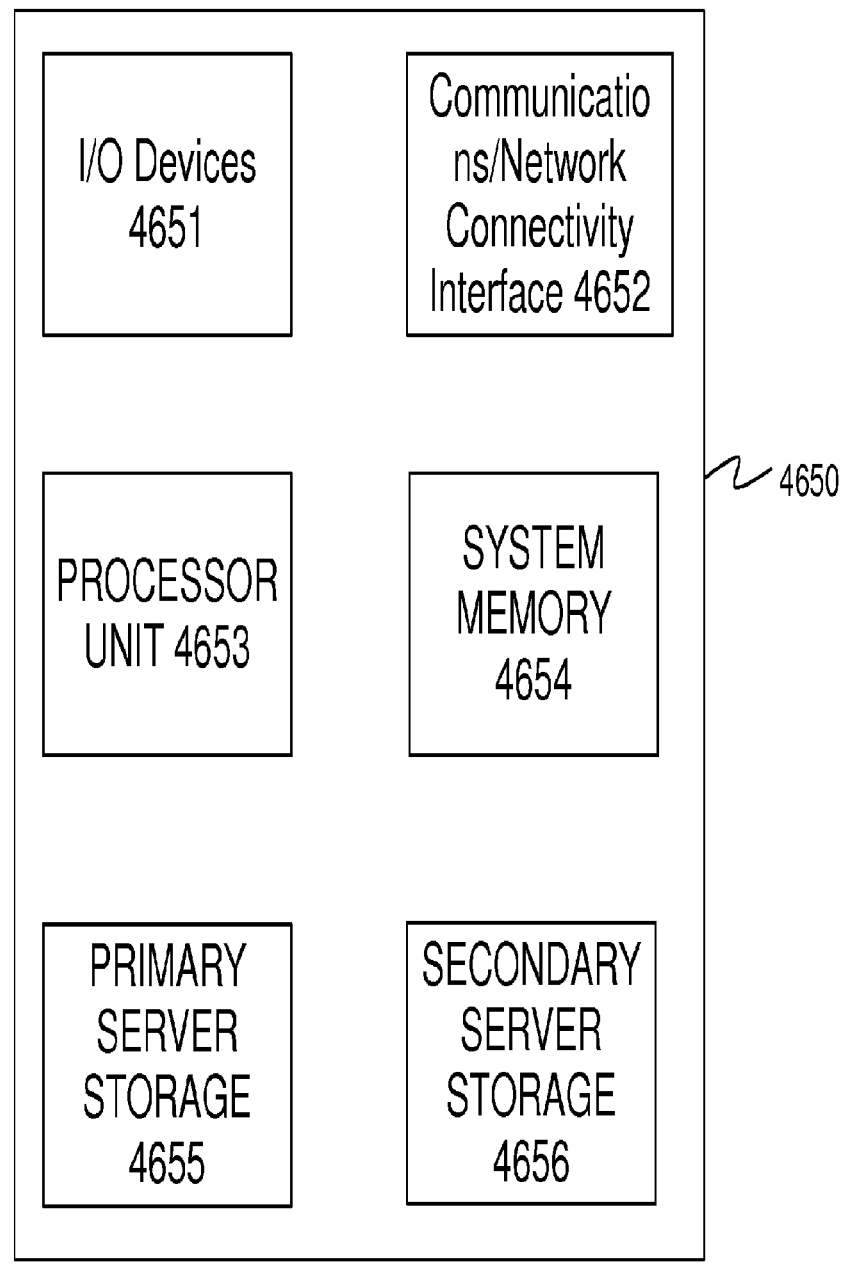
FIG. 46B shows an example computing device system architecture.

FIG. 46B depicts an example computing device system architecture 4650. This computing device system architecture could be used, for example, for a server hosting the view controller 4601 and/or the server objects 4602; or for the back-end server 4603; or any server used in the data retrieval sub-system, in accordance with various embodiments.

The computing device comprises of a processor unit 4653, system memory 4654, primary and secondary storage modules 4655 and 4656, data, input/output devices 4651, and a communications/network connectivity interface 4652 for communicating with other such computing devices.

The processor unit 4653 can consist of a single processor or multiple processors such as central processing unit (CPU) or a graphics processing unit (GPU) or another processing component known in the art. It controls the operation of the computing device, and its responsibilities may include, but are not limited to:

Processing instructions contained within user requests such as request 4606 of FIG. 46A.

Communicating with other components including the database 4604, and storage unit 4605 to store and retrieve information including, but not limited to user information, crew information and videos.

Generating the user interfaces described above, from which users send requests, such as request 4606.

Communicating with externally hosted sub-systems such as payments platforms or analytics sub-systems to perform instructions.

The system memory 4654 can be any combination of random access memory (RAM), read-only memory (ROM), Flash memory, or any other type of computer/digital memory known in the art.

The primary and secondary server storage modules 4655 and 4656 may be a hard-drive, EEPROM, Flash, or other form of storage known in the art. This storage system may contain data pertinent to the GVMS. Data may include, but is not limited to, video, images, audio, documents, files, folders, entire databases such as user names, passwords; threads, processes, application etc. The storage system can consist of multiple banks of storage. For example the secondary storage system can be a bank of several hard drives, several of which may be used for redundancy, security, or back up data. It may be used to supplement storage unit 4605 and database 4604.

The input/output devices 4651 include but are not limited to input devices such as a keyboard, mouse, touch-screen, gesture or voice control, cameras or other devices known in the art, and output devices such as displays, screens, speakers or any other devices known in the art.

The communications/network connectivity interface 4652 can be used to communicate with other servers, both internal and external to the GVMS. If, for example, this architecture 4650 was used for the back-end server, then the database 4604 and storage unit 4605 of FIG. 46A could be connected to the back-end server 4603 via the communications/network connectivity interface 4652. The processor 4653 would communicate with database 4604 and storage unit 4605 via communications/network connectivity interface 4652 to store and retrieve data such as videos, crew data and user data for a user; or to generate the user interfaces described above.

Figure 47:
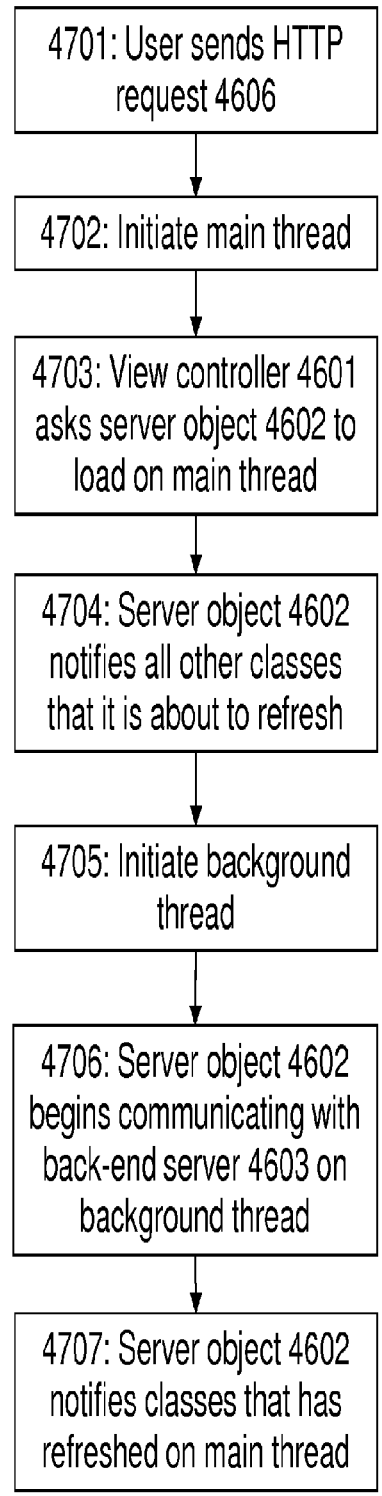
FIG. 47 shows an example sequence of events when a user performs an action on his/her device.

FIG. 47 shows an example sequence of events when a user performs an action on his/her device. In FIG. 47, when the user performs some action (such as selecting a crew) on his/her device, a Hyper Text Transfer Protocol (HTTP) request is sent. (step 4701) Upon receiving this request, a main thread is initiated (step 4702), and the view controller asks the server object to load on a main thread (step 4703). The server object notifies all other classes that are "listening" to its changes that it is about to refresh (allowing any user interfaces to indicate this) (step 4704); initiates a background thread (step 4705); then begins communicating with the back-end server on a separate thread (step 4706). It eventually notifies all other listening classes that it has refreshed on the main thread (step 4707).

FIGS. 46A, 46B and 47 describe an example of an overall system architecture; a computing device system architecture for servers within the overall system architecture; and a sequence of events when a user sends a request. Other architectures and embodiments are also possible. For example, referring to FIG. 46A, in another embodiment there are multiple view controllers, and/or multiple server objects. The view controllers and server objects are in turn implemented on multiple servers. In addition, there could be hardware and software to enable load balancing between the multiple servers. In another embodiment, there are multiple back-end servers connected to multiple databases and multiple storage units.

Figure 48:
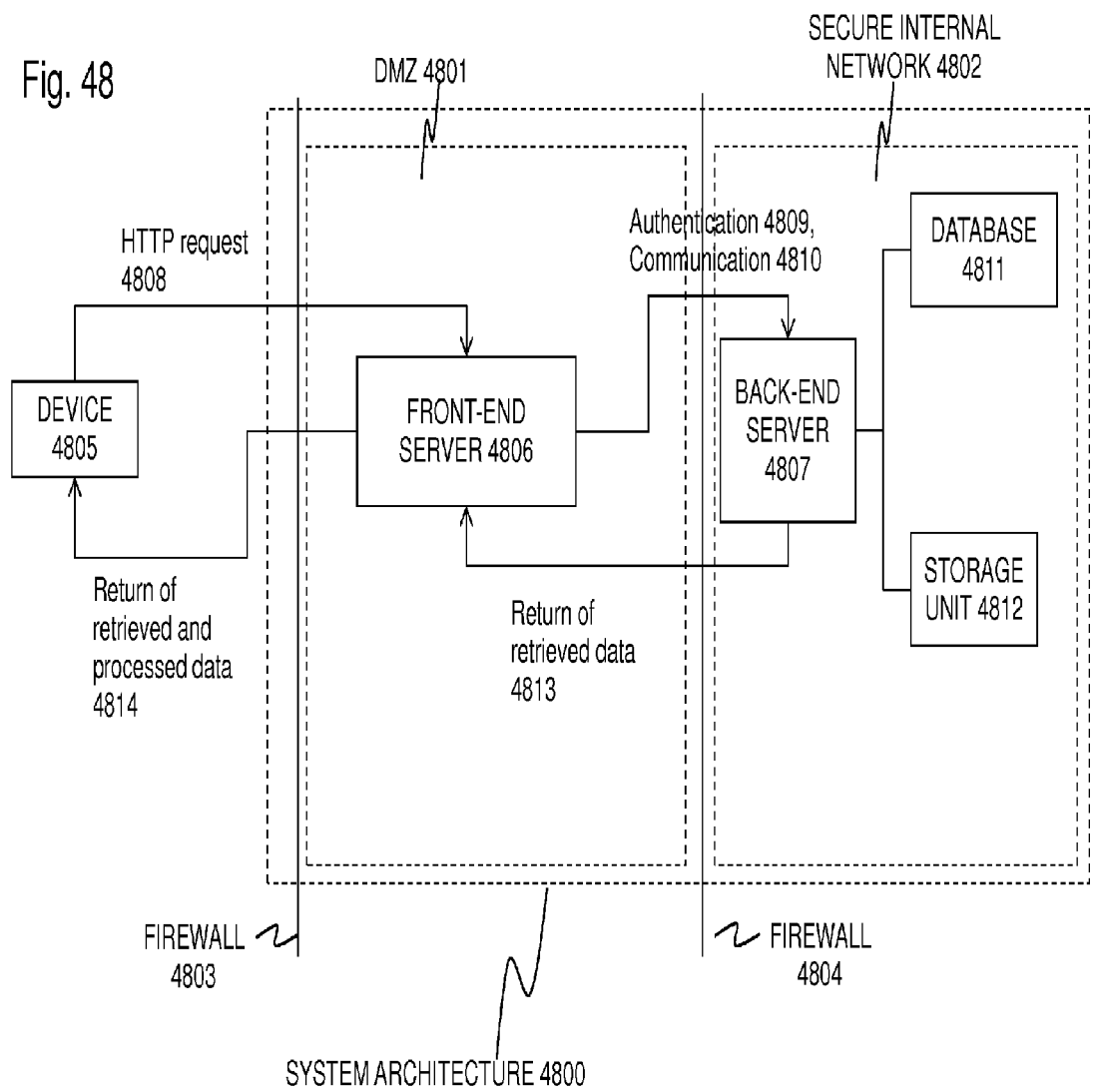
FIG. 48 shows an example of a system architecture with enhanced security.

FIG. 48 shows another embodiment 4800 of the overall system architecture and a sequence of events for data retrieval which affords the advantage of enhanced security. In FIG. 48, the GVMS system architecture 4800 is spread out over two sub-networks: a demilitarized zone (DMZ) sub-network 4801, and a secure internal sub-network 4802. The DMZ sub-network is isolated from the external network by firewall 4803, and the secure internal sub-network is isolated from the DMZ sub-network by firewall 4804.

All communications with devices 4805 external to the GVMS are routed to the front-end server 4806. All data, for example, the database and storage unit, is located in the secure internal sub-network. The back-end server 4807 serves data to the front-end server 4806 in response to a request from the front-end server.

As shown in FIG. 48, if a device sends a request using, for example, the Hyper Text Transfer Protocol (HTTP), the HTTP request 4808 is received by the front-end server 4806. After authenticating the request 4808, the front-end server 4806 first authenticates itself to the back end server during authentication 4809. After authentication 4809, the front end server sends communication 4810 with the back end server 4807. As part of communication 4810, front-end server 4806 sends a new request to the back end server 4807 for the data requested in the initial HTTP request 4808.

The back end server 4807 receives the request within communication 4810, retrieves the data from the database 4811 and/or storage 4812 depending on the request, and returns the data (element 4813) to the front-end server 4806. The front-end server 4806 returns the data to the requesting device 4805, as part of communication 4814, optionally after performing additional processing.

In case a malicious party wanted to attack the system, the malicious party then has to break through 2 firewalls to get to the data stored in the database 4811 and storage unit 4812 within the secure internal sub-network 4802.

The embodiments described above are not the only embodiments possible for the GVMS. As explained previously, in an embodiment users may be placed into different tiers or classes when they first sign up. In another embodiment, it is also possible to distinguish between different tiers or classes for different services. For example, a user could elect to be a premium or "Platinum" class uploader but a "Free" viewer and pays different amounts to enjoy different services.

In another embodiment, even though a user may be at a lower class of service, users could purchase credits for one-off items. For example, a user may want to upload several long videos but is not allowed to due to his/her class of service. The user can then buy credits which enable him/her to upload the longer videos. Users could purchase one-off credits to enable the GVMS to, for example, place their videos at the top of a returned list for searches over a period of time. For example, a user could purchase enough credits to enable the GVMS to place their videos at the top of a returned list for searches featuring the word "Christmas" during December.

In another embodiment, crews are set up to perform specialized video analysis, for example, object detection, signal processing, expert commentary, sports training and the performing arts.

For example, a company which performs advanced signal processing of videos could create a new crew for itself, named Signal Processing Analysis. Then, when a customer approached the company, the customer could upload his/her video(s) to the GVMS, specifying that it was to be shared only within the Signal Processing Analysis crew.

Then, the company could take the video(s) and analyze these videos according to the customer's specifications. The advantage of such a GVMS is that the company does not need to invest in secure storage infrastructure, as the secure storage infrastructure can be hosted, for example, by a third party provider.

Similarly, a company offering video resume evaluation services could set up a crew comprising evaluators. Customers could upload his/her video resume(s) only to be shared only with this crew. The company could analyse this video resume and offer the customer with feedback.

In another embodiment, the GVMS could also be used to enable different applications, such as dating. For example, the crew could be the clients of a dating service. These crew members could then upload videos of themselves to be viewed by prospective matches.

In another embodiment, users are allowed to upload other information, such as but not limited to text, still images, animation files, audio and/or documents, for example, Adobe® Portable Document Format, Microsoft® Word, Microsoft® Excel and Microsoft® Powerpoint in a similar fashion as that described for video.

In another embodiment, crews are able to exchange videos with each other. For example, one crew could decide to give another crew access to videos which have certain tags.

In another embodiment, the GVMS may restrict access to videos based on age. For example, when a new user registers his/her details with the GVMS, as explained previously, the GVMS asks details including date of birth. If the user is determined to be below a threshold age, for example 18 years of age, then the user may be banned from watching certain videos, if they have been tagged, for example, as "18+" or "adult."

Figure 49:
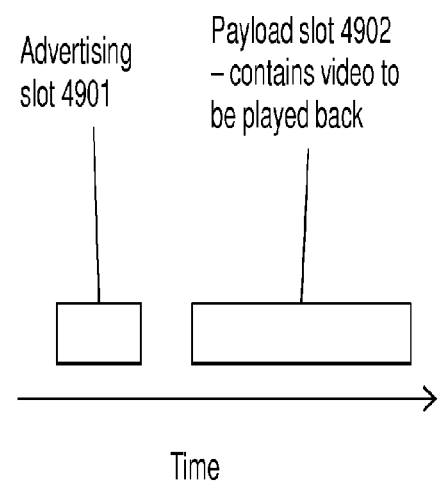
FIG. 49 shows an example of inclusion of advertisements with videos.

In another embodiment, advertisements are included with videos. Then as shown in FIG. 49, when a video is played back to a viewer, there are 2 distinct portions to the video:

Advertising slot 4901, which is where the advertisement is played back to the viewer, and Payload slot 4902, which contains the video to be played back.

This is one example embodiment. In another embodiment, the advertising slot 4901 occurs after the payload 4902. In yet another embodiment, the advertising slot 4901 may be used to split the payload slot 4902 into two separate sub-slots.

In one embodiment, advertising slot 4901 duration can be set by the GVMS itself. In another embodiment, the duration may depend on the preferences of the user who uploaded the video.

Prospective buyers of advertising space can then bid for advertising slots such as slot 4901, with the highest bidder winning. In yet another embodiment, the GVMS or the user uploading the video can set a reserve price similar to that seen in a normal auction. If all bids are below the reserve price, then the bid closest to the reserve price can be taken.

In another embodiment, multiple advertisements may be shown within the advertising slot 4901 for the same video. For example, a user, when uploading his/her video may decide to allow an advertising slot duration of up to 10 seconds. If the 2 highest bidders have videos of 6 s and 4 s respectively, then both bidders may be accommodated within the slot.

In another embodiment, there may be multiple advertising slots for the same video. These slots could be positioned, for example, before the video and after the video. In yet another embodiment, the payload slot is split into multiple segments and there are multiple advertising slots sandwiched in between segments, as well as before the first segment and after the last segment.

In another embodiment, uploading users can have revenue sharing arrangement with the group video messaging site, for example, for every bid, a certain percentage of revenue can go to the uploading user.

Bidders can "tailor" their bids according to different criteria set by the GVMS. Bidders may bid on several different bases, including, for example:

a per upload basis, where bidders bid every time a new video is uploaded;

a per play basis, where bidders bid every time a new video is played or for the $n^{th}$ time a video is played;

an interval basis, where bidders bid for slots on all videos uploaded during a certain interval, or all videos played during a certain interval;

a per crew basis, where bidders bid for all videos posted to a certain crew;

a per tag basis, where bidders bid for all videos containing the same tag; and a per viewer basis, where bidders bid for all videos played by a given viewer.

In another embodiment, as previously explained, the user can submit feedback to the system administrators of the GVMS, using for example, the "Send Feedback" button of FIG. 27. If the user clicks on the "Send Feedback" button 2701, the user is sent to a feedback screen.

Figure 50:
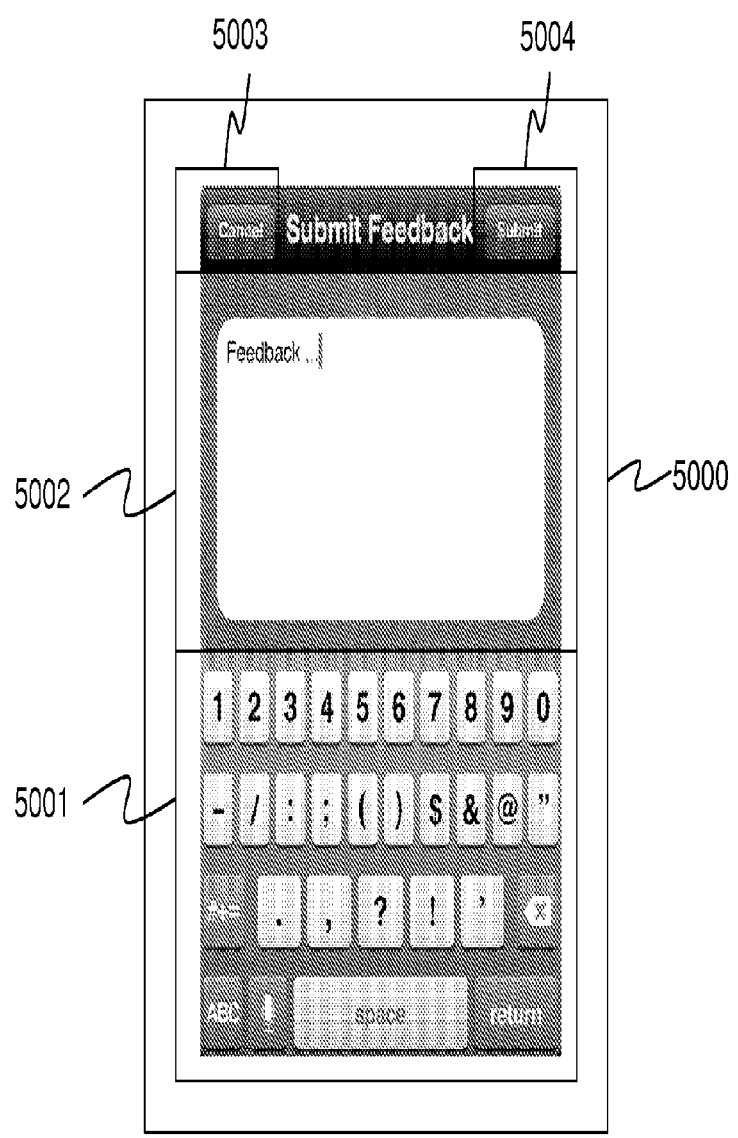
FIG. 50 shows an example of a feedback screen.

FIG. 50 shows an example of a feedback screen 5000. The user can type in feedback using the keyboard 5001, and the user can view the comments as he/she types out feedback in area 5002. Once the user has finished typing out the comments, the user can submit the comments using "Submit" button 5004. If the user wishes to abort the process, the user can click on "Cancel" button 5003.

In another embodiment, the GVMS has a platform to ensure secure payments. This platform may be internal to the GVMS, or may be hosted by a third party provider, for example, Paypal. In the case where the platform is externally hosted, the platform could then be connected to a server such as the back-end server 4603 of FIG. 46A or the front-end server 4806 of FIG. 48 over a network, including, but not limited to, the Internet, a local area network (LAN), wide area network (WAN), wireless network, personal area network (PAN) or other form of networked communication known in the art.

Similarly, an externally hosted analytics sub-system such as the KISSmetrics® sub-system described previously may be connected to the back-end server 4603 of FIG. 46A or the front-end server 4806 of FIG. 48 over a network, including, but not limited to, the Internet, a local area network (LAN), wide area network (WAN), wireless network, personal area network (PAN) or other form of networked communication known in the art.

In the foregoing description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be implemented in a network having endpoints, such as servers or other computing devices, and associated encoding components. The encoding components, and the described methods, can be implemented in hardware, software or a combination thereof. Those portions that are implemented in software can be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method. Those of ordinary skill in the art will appreciate that other instructions and operations necessary to implement the described embodiments may also be stored on the machine-readable medium. Software running from the machine readable medium may interface with circuitry to perform the described tasks.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A group video messaging method comprising storing authorized user information identifying two or more authorized users of a video messaging system, creating an encoding channel coupling one or more user devices belonging to said authorized users to an application server over at least one network, said encoding channel used to carry one or more types of traffic, setting a target loss ratio for said encoding channel depending on type of said traffic being carried, providing a user interface, said user interface permitting said authorized users to transfer, using said encoding channel, video files to said video messaging system for storage and retrieval, and to identify criteria for other authorized users to access each transferred video file, said user interface hosted on said application server, storing in said video messaging system the video files transferred to said system by said authorized users, storing user input information identifying the user that transferred each stored video file to said video messaging system, and said criteria for authorized users to access said stored video files, storing user access information identifying different groups of said authorized users and which of said stored video files are to be accessible to each of said authorized users or authorized user groups, storing retrieval information associated with retrieval of said video files by said authorized users and presenting one or more of said user input information, user access information and retrieval information on one or more maps.

2. The group video messaging method of claim 1 in which identifications of at least some of said different groups of authorized users are accessible at said user interface, and said user interface permits any authorized user to select and join any of said accessible groups.

3. The group video messaging method of claim 1 in which identifications of at least some of said authorized users are accessible at said user interface, and said user interface permits any authorized user to invite any of said authorized users with accessible identifications to join one of said groups of authorized users.

4. The group video messaging method of claim 1, wherein at least some of said authorized users joined some of the said different groups by auto joining.

5. The group video messaging method of claim 1, further comprising inviting at least some of said authorized users to join one or more of said different groups.

6. The group video messaging method of claim 1, further comprising storing information associated with retrieval of said video files by said authorized users.

7. The group video messaging method of claim 1, wherein said at least one network comprises an access network.

8. The group video messaging method of claim 7, further wherein
said one or more types of traffic comprise voice data and video files; and
said encoding channel has a higher target loss ratio for when said voice data is carried compared to when said video files are carried.

9. The group video messaging method of claim 8, wherein said intermediate server is a traversal using relays-around-network-address-translator (TURN) server.

10. A group video messaging system comprising
a storage device containing video files, user information identifying authorized users of said video messaging system, and information identifying different groups of said authorized users and which of said video files are to be accessible to each of said authorized users or authorized user groups;
a processor coupled to said storage device for controlling the storage and retrieval of said user information;
a user interface coupled to said processor and hosted on an application server to permit said authorized users to transfer to said processor
(1) video files for storage in said storage device,
(2) criteria for other authorized users to access each transferred video file, and
(3) user input information identifying the transferring user;
(4) user access information associated with retrieval of said video files by said authorized users;
(5) one or more maps displaying one or more of said user input information and said user access information; and
an encoding channel coupling one or more user devices to said processor over at least one network, said encoding channel used to carry one or more types of traffic
using a target loss ratio set depending on the type of said traffic being carried.

11. The system of claim 10, wherein at least some of said authorized users joined one or more of the said different groups by auto joining.

12. The system of claim 10, further comprising inviting at least some of said authorized users to join one or more of said different groups.

13. The system of claim 10, further comprising storing information associated with retrieval of said video files by said authorized users.

14. The system of claim 10, wherein said at least one network comprises an access network.

15. The system of claim 10, further wherein
said one or more types of traffic comprise voice data and video files; and
said encoding channel has a higher target loss ratio for when said voice data is carried compared to when said video files are carried.

\* \* \* \* \*